United States Patent
Walton et al.

(10) Patent No.: US 7,885,228 B2
(45) Date of Patent: Feb. 8, 2011

(54) TRANSMISSION MODE SELECTION FOR DATA TRANSMISSION IN A MULTI-CHANNEL COMMUNICATION SYSTEM

(75) Inventors: Jay Rod Walton, Carlisle, MA (US); Irina Medvedev, Somerville, MA (US)

(73) Assignee: Qualcomm Incorporated, San Diego, CA (US)

( * ) Notice: Subject to any disclaimer, the term of this patent is extended or adjusted under 35 U.S.C. 154(b) by 1451 days.

(21) Appl. No.: 10/394,529

(22) Filed: Mar. 20, 2003

(65) Prior Publication Data

US 2004/0184398 A1 Sep. 23, 2004

(51) Int. Cl.
H04W 4/00 (2009.01)
H04B 17/00 (2006.01)
H04B 7/185 (2006.01)
H04M 1/00 (2006.01)
H04K 1/10 (2006.01)

(52) U.S. Cl. .................... 370/329; 370/341; 455/226.3; 455/13.3; 455/562.1; 375/260

(58) Field of Classification Search ................ 370/332, 370/329, 334, 437, 341; 455/226.3, 13.3, 455/277.2, 693, 63.1, 562.1; 375/260
See application file for complete search history.

(56) References Cited

U.S. PATENT DOCUMENTS

| | | | |
|---|---|---|---|
| 6,144,711 A * | 11/2000 | Raleigh et al. | 375/347 |
| 6,426,971 B1 | 7/2002 | Wu et al. | |
| 6,463,290 B1 * | 10/2002 | Stilp et al. | 455/456.1 |
| 6,478,422 B1 | 11/2002 | Hansen | |
| 6,785,341 B2 | 8/2004 | Walton et al. | |
| 6,821,535 B2 | 11/2004 | Nurmi et al. | |
| 6,927,728 B2 * | 8/2005 | Vook et al. | 342/377 |

(Continued)

FOREIGN PATENT DOCUMENTS

WO 97036377 10/1997

(Continued)

OTHER PUBLICATIONS

International Search Report-PCT/US04/008665, International Search Authority-European Patent Office-Oct. 6, 2004.

(Continued)

*Primary Examiner*—Rafael Pérez-Gutiérrez
*Assistant Examiner*—Allahyar Kasraian
(74) *Attorney, Agent, or Firm*—Turocy & Watson, LLP

(57) ABSTRACT

Techniques to select a suitable transmission mode for a data transmission in a multi-channel communication system with multiple transmission channels having varying SNRs. In one method, an SNR estimate is initially obtained for each of multiple transmission channels used to transmit a data stream. An average SNR and an unbiased variance are then computed for the SNR estimates for the multiple transmission channels. A back-off factor is determined, for example, based on the SNR variance and a scaling factor. An operating SNR for the transmission channels is next computed based on the average SNR and the back-off factor. The transmission mode is then selected for the data stream based on the operating SNR. The selected transmission mode is associated with a highest required SNR that is less than or equal to the operating SNR. The method may be used for any system with multiple transmission channels having varying SNRs.

20 Claims, 11 Drawing Sheets

U.S. PATENT DOCUMENTS

| | | | |
|---|---|---|---|
| 7,006,848 | B2 | 2/2006 | Ling et al. |
| 7,039,125 | B2 * | 5/2006 | Friedman ................... 375/297 |
| 7,058,367 | B1 * | 6/2006 | Luo et al. ................... 455/101 |
| 7,095,709 | B2 | 8/2006 | Walton et al. |
| 7,116,652 | B2 * | 10/2006 | Lozano ....................... 370/334 |
| 7,151,809 | B2 | 12/2006 | Ketchum et al. |
| 7,184,713 | B2 | 2/2007 | Kadous et al. |
| 7,191,381 | B2 * | 3/2007 | Gesbert et al. .............. 714/759 |
| 7,324,429 | B2 * | 1/2008 | Walton et al. ............... 370/203 |
| 7,636,573 | B2 * | 12/2009 | Walton et al. ............... 455/454 |
| 2002/0027951 | A1 * | 3/2002 | Gormley et al. ............ 375/224 |
| 2002/0075830 | A1 * | 6/2002 | Hartman, Jr. ................ 370/333 |
| 2002/0127978 | A1 * | 9/2002 | Khatri ........................ 455/103 |
| 2002/0154705 | A1 | 10/2002 | Walton et al. |
| 2002/0163974 | A1 * | 11/2002 | Friedman ................... 375/295 |
| 2003/0125040 | A1 * | 7/2003 | Walton et al. ............... 455/454 |
| 2003/0236080 | A1 * | 12/2003 | Kadous et al. ........... 455/226.1 |
| 2004/0082356 | A1 | 4/2004 | Walton et al. |
| 2004/0120411 | A1 * | 6/2004 | Walton et al. ............... 375/260 |
| 2004/0136349 | A1 * | 7/2004 | Walton et al. ............... 370/338 |
| 2004/0252632 | A1 * | 12/2004 | Bourdoux et al. ........... 370/210 |
| 2008/0069015 | A1 * | 3/2008 | Walton et al. ............... 370/280 |
| 2008/0267098 | A1 * | 10/2008 | Walton et al. ............... 370/280 |
| 2008/0267138 | A1 * | 10/2008 | Walton et al. ............... 370/336 |
| 2010/0067401 | A1 * | 3/2010 | Medvedev et al. .......... 370/253 |
| 2010/0119001 | A1 * | 5/2010 | Walton et al. ............... 375/260 |

FOREIGN PATENT DOCUMENTS

| | | |
|---|---|---|
| WO | 01082521 | 11/2001 |
| WO | WO 02/093784 A1 | 11/2002 |

OTHER PUBLICATIONS

Written Opinion-PCT/US04/008665, International Search Authority-European Patent Office-Oct. 6, 2004.

Office Action dated Aug. 13, 2008 for Australian Application Serial No. 2004223374, 2 pages.

Office Action dated Jun. 27, 2008 for Chinese Application Serial No. 200480011307.6, 3 pages.

* cited by examiner

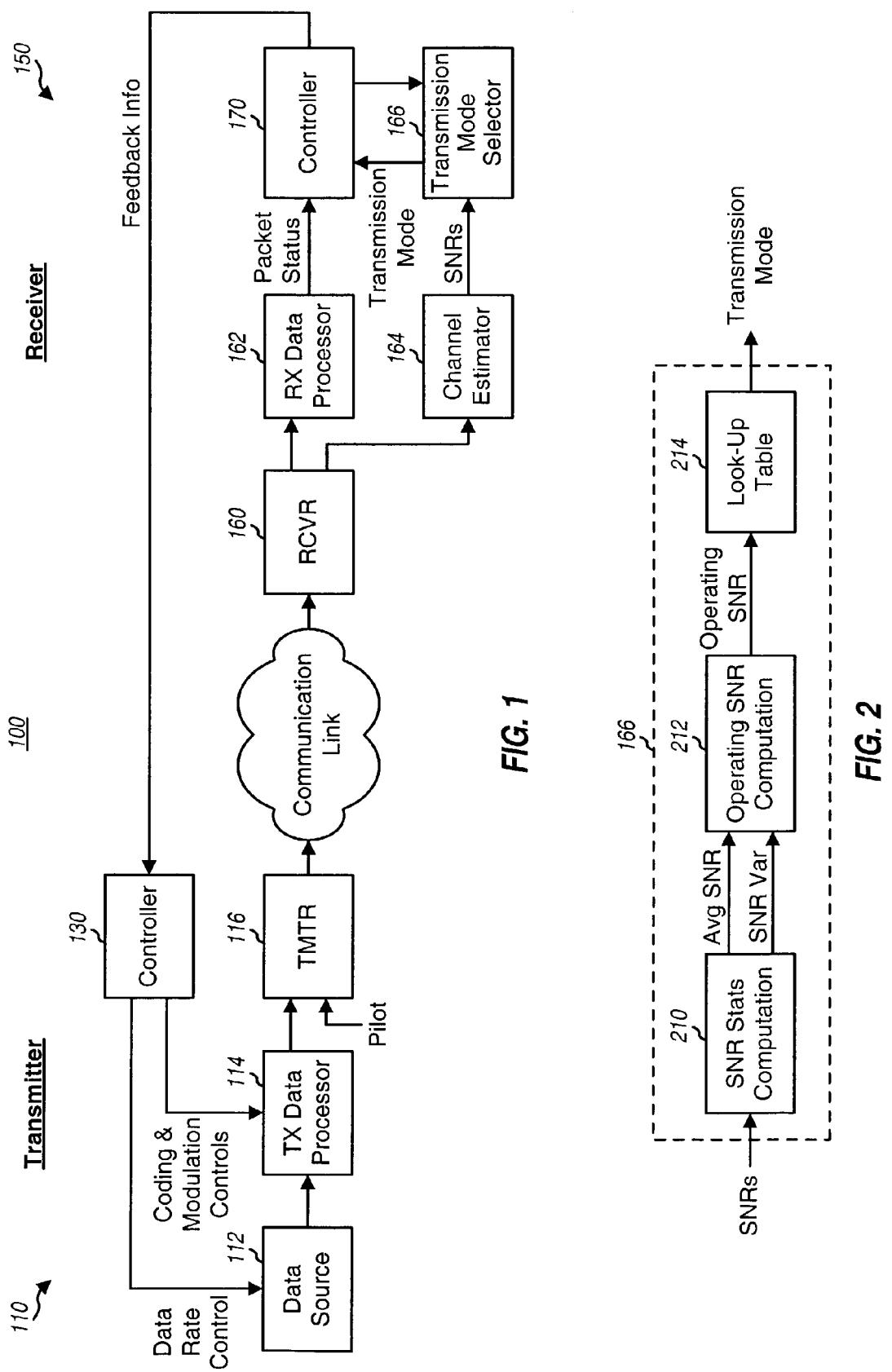

TRANSMISSION MODE SELECTION FOR DATA TRANSMISSION IN A MULTI-CHANNEL COMMUNICATION SYSTEM

BACKGROUND

1. Field

The present invention relates generally to data communication, and more specifically to techniques for selecting a suitable transmission mode for a data transmission in a multi-channel communication system.

2. Background

A multi-channel communication system utilizes multiple "transmission" channels for data transmission. These transmission channels may be formed in the time domain, frequency domain, spatial domain, or a combination thereof. For example, the multiple transmission channels may correspond to different time slots in a time division multiplex (TDM) communication system, different frequency subbands in an orthogonal frequency division multiplex (OFDM) communication system, or different spatial channels in a multiple-input multiple-output (MIMO) communication system. The TDM, OFDM, and MIMO systems are described in further detail below.

The multiple transmission channels in the multi-channel communication system may experience different channel conditions (e.g., different fading, multipath, and interference effects) and may achieve different signal-to-noise-and-interference ratios (SNRs). The SNR of a transmission channel determines its transmission capability, which is typically quantified by a particular data rate that may be reliably transmitted on the transmission channel. If the SNR varies from transmission channel to transmission channel, then the supported data rate would also vary from channel to channel. Moreover, since the channel conditions typically vary with time, the data rates supported by the transmission channels would also vary with time.

A major challenge in a coded communication system is selecting the appropriate transmission mode(s) to use for data transmission based on the channel conditions. As used herein, a "transmission mode" may indicate a particular data rate or information bit rate, a particular coding scheme, a particular modulation scheme, or a combination thereof, to use for a given data transmission. The goal of the transmission mode selection should be to maximize throughput on the multiple transmission channels while meeting certain quality objectives, which may be quantified by a particular packet error rate (PER).

One straightforward technique is to select a particular transmission mode for each of the multiple transmission channels based on its SNR (i.e., the transmission mode selection is done on a per transmission channel basis to "bit load" each transmission channel according to its SNR). The data for each transmission channel would then be sent at the data rate and with the coding and modulation schemes associated with the transmission mode selected for that transmission channel. However, this technique has some major drawbacks. First, coding individually for each transmission channel can significantly increase the complexity of the data processing at both a transmitter and a receiver. Second, coding individually for each transmission channel may greatly increase coding and decoding delay. Third, a high feedback rate may be needed to send back information (e.g., the SNR or transmission mode) for each transmission channel, which is needed by the transmitter to code and modulate data on a channel-by-channel basis.

Another technique is to use a common transmission mode for all transmission channels. This technique avoids the major drawbacks of the bit-loading technique. However, if a data transmission is sent on multiple transmission channels with varying SNRs, then the SNR would vary correspondingly across the received data transmission. The challenge is then to select the proper transmission mode to use for the data transmission in light of the varying SNRs, so that the data transmission can be reliably received. If the data rate for the selected transmission mode is too high, then the entire data transmission would be received in error. Conversely, if the data rate for the selected transmission mode is too low, then the transmission capacity of the multiple transmission channels is under utilized.

There is therefore a need in the art for techniques to determine a suitable transmission mode for data transmission on multiple transmission channels having varying SNRs.

SUMMARY

Techniques are provided herein to select the proper transmission mode for a data transmission in a multi-channel communication system with multiple transmission channels having varying SNRs. A suitable transmission mode may be determined for each data stream to be independently processed (e.g., coded and modulated) and transmitted on a designated group of transmission channels.

In one specific method of determining a suitable transmission mode for a data stream sent on multiple transmission channels, an SNR estimate (for example, in units of dB) is initially obtained for each of the multiple transmission channels used to transmit that data stream. An average SNR, $\gamma_{avg}$, is then computed for the SNR estimates for the multiple transmission channels as $$\gamma_{avg} = \frac{1}{N_C} \sum_{i=1}^{N_C} \gamma_i,$$

where $\gamma_i$ is the SNR estimate for transmission channel i and $N_C$ is the number of transmission channels used for the data transmission. The variance of the SNR estimates, $\sigma_\gamma^2$, is also computed as $$\sigma_\gamma^2 = \frac{1}{N_C - 1} \sum_{i=1}^{N_C} (\gamma_i - \gamma_{avg})^2.$$

A back-off factor, $\gamma_{bo}$, is then determined, for example, based on a function $F(\gamma_{avg}, \sigma_\gamma^2)$ of the average SNR and the SNR variance. For example, the function $F(\gamma_{avg}, \sigma_\gamma^2) = K_b \cdot \sigma_\gamma^2$ may be used for the back-off factor, where $K_b$ is a scaling factor that may be selected based on one or more characteristics of the system, such as, for example, the interleaving, packet size, and/or type of coding scheme used for the data stream. An operating SNR, $\gamma_{op}$, for the transmission channels is next computed based on the average SNR and the back-off factor as $\gamma_{op} = \gamma_{avg} - \gamma_{bo}$. The transmission mode for the data stream is then selected based on the operating SNR, for example, using a look-up table of supported transmission modes and their required SNRs. The selected transmission mode is utilized for all of the multiple transmission channels used to transmit the data stream.

A set of transmission modes may be supported by the system, and the minimum SNR required to achieve a particular level of performance (e.g., 1% PER) may be determined for each supported transmission mode based on an additive white Gaussian noise (AWGN) channel with no fading. The transmission mode selected for the data stream is the supported transmission mode with the highest data rate and a required SNR that is less than or equal to the operating SNR. The method may be used for any system with multiple transmission channels, such as TDM, OFDM, MIMO, and MIMO-OFDM systems (all of which are described below).

The transmission mode selection techniques described herein may be used for various transmission schemes in a MIMO-OFDM system. For an all-antenna transmission scheme, one data stream is transmitted on all subbands of all transmit antennas. The transmission mode for this data stream may be selected based on SNR estimates for all subbands of all transmit antennas. For a per-antenna transmission scheme, one data stream is transmitted on all subbands of each transmit antenna. The transmission mode for each data stream may be selected based on SNR estimates for all subbands of the transmit antenna used for that data stream. For a per-eigenmode transmission scheme, one data stream is transmitted on all subbands of each wideband eigenmode (described below). The transmission mode for each data stream may be selected based on SNR estimates for all subbands of the wideband eigenmode used for that data stream.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIG. 1 shows a transmitter and a receiver in a multi-channel communication system;

FIG. 2 shows a transmission mode selector;

FIGS. 9A and 8B show a receiver subsystem and a receiver unit within the receiver subsystem, respectively.

DETAILED DESCRIPTION

Figure 3:
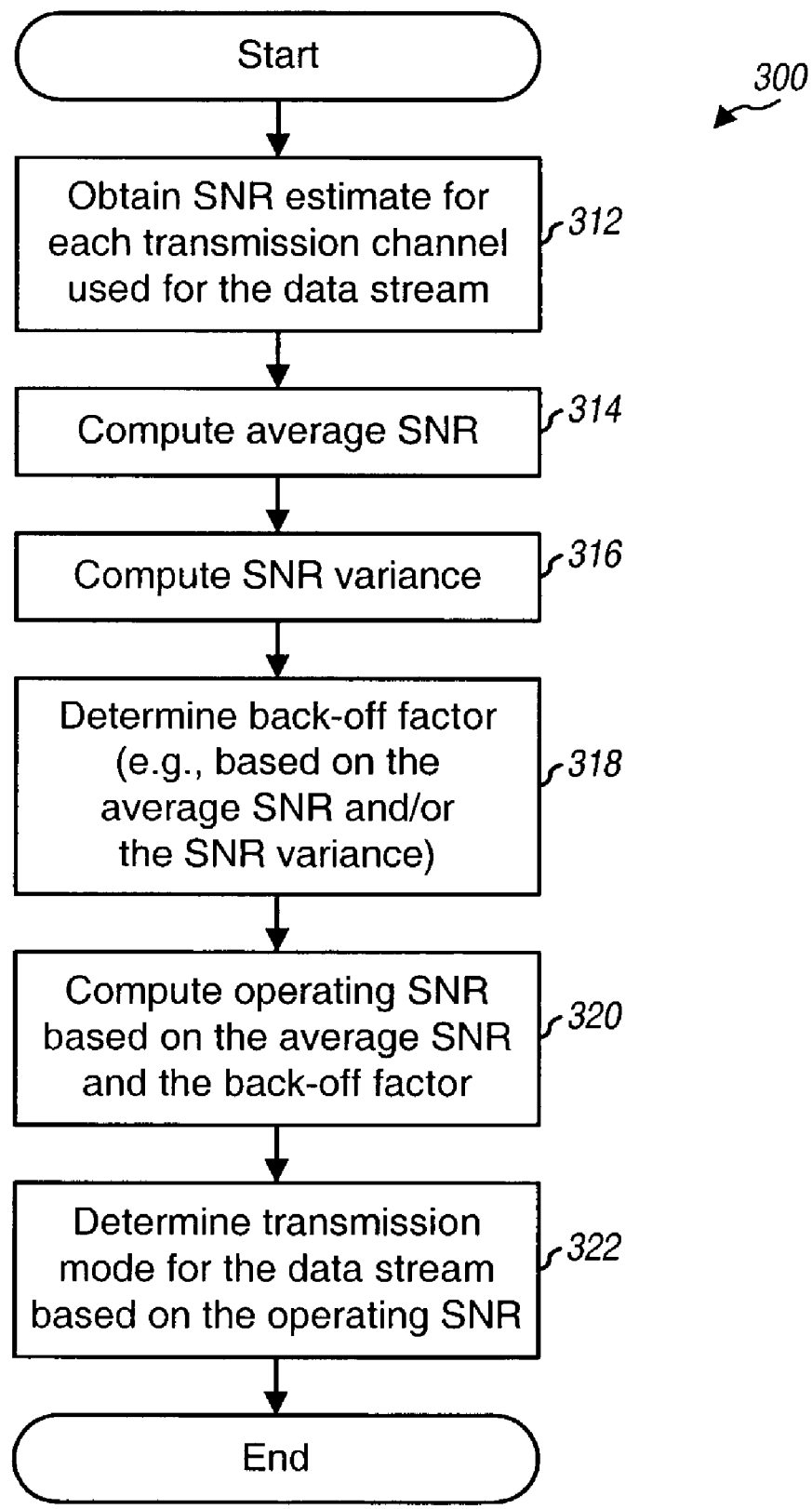
FIG. 3 shows a process to determine the transmission mode for a data stream sent on a group of transmission channels with varying SNRs.

The word "exemplary" is used herein to mean "serving as an example, instance, or illustration." Any embodiment or design described herein as "exemplary" is not necessarily to be construed as preferred or advantageous over other embodiments or designs.

The transmission mode selection techniques described herein may be used for various types of multi-channel communication system having multiple transmission channels that may be used for data transmission. For example, these techniques may be used for TDM systems, OFDM-based systems, MIMO systems, MIMO systems that utilize OFDM (i.e., MIMO-OFDM systems), and so on.

A TDM system may transmit data in frames, each of which may be of a particular time duration. Each frame may include multiple ($N_{TS}$) time slots that may be assigned different indices. $N_{TS}$ transmission channels may be formed for the $N_{TS}$ time slots in each frame.

An OFDM system effectively partitions the overall system bandwidth into multiple ($N_F$) orthogonal subbands, which may also be referred to as tones, bins, and frequency channels. Each subband is associated with a respective carrier that may be modulated with data. $N_F$ transmission channels may be formed for the $N_F$ subbands.

A MIMO system employs multiple ($N_T$) transmit antennas and multiple ($N_R$) receive antennas for data transmission, and is denoted as an ($N_T$, $N_R$) system. A MIMO channel formed by the $N_T$ transmit and $N_R$ receive antennas may be decomposed into $N_S$ independent channels, with $N_S \leq \min\{N_T, N_R\}$. Each of the $N_S$ independent channels may also be referred to as a spatial channel or an eigenmode of the MIMO channel. The number of spatial channels is determined by a channel response matrix H that describes the response between the $N_T$ transmit and $N_R$ receive antennas. For simplicity, the following description assumes that the channel response matrix H is full rank, in which case the number of spatial channels is given as $N_S = N_T \leq N_R$. $N_T$ transmission channels may be formed for the $N_T$ spatial channels.

A MIMO-OFDM system has $N_T$ spatial channels for each of $N_F$ subbands. A transmission channel may be formed for each spatial channel of each subband. $N_F \cdot N_T$ transmission channels would then be available for data transmission between the $N_T$ transmit antennas and $N_R$ receive antennas.

In general, multiple transmission channels may be formed in various manners, some examples of which are described above. Each transmission channel is associated with a received SNR that is indicative of the transmission capability of that channel. The received SNR of a given transmission channel may be estimated by a receiver, for example, based on a pilot sent on that transmission channel.

FIG. 1 shows a block diagram of a transmitter 110 and a receiver 150 in a multi-channel communication system 100. At transmitter 110, traffic data is provided from a data source 112 to a transmit (TX) data processor 114, which demultiplexes the traffic data into $N_D$ data streams, where $N_D \geq 1$. Each data stream may be independently processed and transmitted on a respective group of transmission channels. Each data stream is associated with a particular transmission mode that indicates a set of parameter values for that data stream. For example, the transmission mode for each data stream may indicate (or may be associated with) a particular data rate or information bit rate, a particular coding scheme or code rate, a particular interleaving scheme, a particular modulation scheme, and so on, to use for that data stream. For a given transmission mode, the data rate may be determined by the coding scheme and the modulation scheme associated with that transmission mode. An exemplary set of transmission modes is given in Table 1. For each data stream, the data rate is determined by a data rate control, the coding scheme is determined by a coding control, and the modulation scheme is determined by a modulation control. These controls are provided by a controller 130 and are generated based on feedback information received from receiver 150.

For each data stream, TX data processor 114 codes, interleaves, and modulates the data in accordance with the coding, interleaving, and modulation schemes selected for that data stream to provide a corresponding stream of modulation symbols. TX data processor 114 provides $N_D$ modulation symbol streams for the $N_D$ data streams.

A transmitter unit (TMTR) 116 then receives and processes the $N_D$ modulation symbol streams in a manner specified by the system. For example, transmitter unit 116 may perform OFDM processing for an OFDM system, spatial processing for a MIMO system, or both spatial and OFDM processing for a MIMO-OFDM system. A pilot may also be transmitted to receiver 150 to assist it perform a number of functions such as channel estimation, acquisition, frequency and timing synchronization, coherent demodulation, and so on. In this case, transmitter unit 116 may receive and multiplex pilot symbols with the modulation symbols. Transmitter unit 116 provides a modulated signal for each antenna used for data transmission.

Each modulated signal is then transmitted from a respective transmit antenna over a wireless communication link to receiver 150. The communication link distorts the modulated signals with a particular channel response and further degrades the modulated signals with (1) additive white Gaussian noise (AWGN) having a variance of $N_0$ and (2) possibly interference from other transmission sources.

At receiver 150, the transmitted signals are received by each receive antenna, and the received signal from each antenna is provided to a receiver unit (RCVR) 160. Receiver unit 160 conditions and digitizes each received signal to provide a corresponding stream of samples. Receiver unit 160 further processes the samples in a manner that is complementary to that performed by transmitter unit 116 to provide $N_D$ streams of "recovered" symbols, which are estimates of the $N_D$ streams of modulation symbols sent by transmitter 110. The recovered symbol streams are then provided to a receive (RX) data processor 162 and processed to obtain decoded data for the transmitted data streams. The processing by RX data processor 162 may include demodulation (i.e., symbol demapping), deinterleaving, and decoding. RX data processor 162 may further provide the status of each received data packet.

Receiver unit 160 may also provide "received" symbols (i.e., symbols after OFDM processing but prior to spatial processing by receiver unit 160) and/or recovered symbols to a channel estimator 164. Channel estimator 164 may then process these symbols to obtain an SNR estimate for each transmission channel used for data transmission. The SNR estimates are typically obtained based on received pilot symbols, but may also be obtained based on received data symbols or a combination of received pilot and data symbols. A transmission mode selector 166 receives the SNR estimates from channel estimator 164 and determines a suitable transmission mode for each of the $N_D$ data streams.

A controller 170 receives the $N_D$ transmission modes from transmission mode selector 166 and the packet status from RX data processor 162 and assembles feedback information for transmitter 110. The feedback information may include the $N_D$ transmission modes for the $N_D$ data streams, acknowledgments (ACKs) and negative acknowledgments (NAKs) for received data packets, and/or other information. The feedback information is then sent to transmitter 110 and used to adjust the processing of the $N_D$ data streams sent to receiver 150. For example, transmitter 110 may use the feedback information to adjust the data rate, the coding scheme, the modulation scheme, or any combination thereof, for each data stream sent to receiver 150. The feedback information is used to increase the efficiency of the system by allowing data to be transmitted at the best-known settings supported by the communication link.

In the embodiment shown in FIG. 1, the transmission mode selection is performed by receiver 150 and the selected transmission mode for each data stream is sent back to transmitter 110. In other embodiments, the transmission mode selection may be performed by (1) the transmitter based on feedback information provided by the receiver and/or other information obtained by the transmitter or (2) jointly by both the transmitter and receiver.

An AWGN communication link (e.g., an AWGN channel) is characterized by a frequency response that is flat across the transmission channels. For an AWGN channel, the transmission channels achieve similar received SNRs. If a data packet is transmitted on a group of transmission channels with similar received SNRs, then the SNR would be approximately constant across the entire data packet. For "constant SNR" data packets, the relationship between required SNR and data rate for a particular level of performance is well known in the art. The desired level of performance may be quantified by a particular packet error rate (PER), frame error rate (FER), block error rate (BLER), bit error rate (BER), or some other measure. A suitable transmission mode may readily be selected based on the received SNR of the AWGN transmission channels.

However, as noted above, the multiple transmission channels may experience different channel conditions and achieve different received SNRs. If a data packet is transmitted on a group of transmission channels with different received SNRs, then the SNR would vary correspondingly across the received data packet. This problem of "varying SNR" packet is exacerbated for a wideband communication system and for a "multipath" channel with frequency selective fading (i.e., a response that is not flat across the transmission channels). The techniques described herein address a major challenge for a coded multi-channel communication system, which is to determine the maximum data rate that may be used for each data stream sent on a group of transmission channels with varying SNRs for a particular desired level of performance.

FIG. 2 shows a block diagram of an embodiment of transmission mode selector 166, which can determine a suitable transmission mode for each of the $N_D$ data streams. Each data stream is transmitted on a respective group of transmission channels. For simplicity, transmission mode selection for one data stream is described below. For the following description, SNRs are given in units of decibels (dB).

Within transmission mode selector 166, an SNR statistics computation unit 210 receives SNR estimates for the group of transmission channels used for the data stream. The SNR estimate for a given transmission channel may be expressed as:

$$\gamma_i = 10\log_{10}\left(\frac{|s_i|^2}{N_0}\right), \text{ for } i = 1, \ldots, N_C, \text{ (dB)} \quad \text{Eq (1)}$$

where i is an index for the transmission channels used for the data stream;

$N_C$ is the number of transmission channels used for the data stream;

$s_i$ is the complex gain for transmission channel i;

$N_0$ is the noise variance for transmission channel i; and $\gamma_i$ is the SNR estimate for transmission channel i.

The derivation of SNR estimates for several types of multi-channel communication systems is described below. Unit 210 computes the average SNR and the unbiased variance of the SNR estimates.

The average SNR may be computed as follows:

$$\gamma_{avg} = \frac{1}{N_C} \sum_{i=1}^{N_C} \gamma_i, \text{ (dB)} \qquad \text{Eq (2)}$$

where i is an index for the transmission channels used for the data stream;
  $\gamma_i$ is the SNR estimate for transmission channel i; and
  $\gamma_{avg}$ is the average SNR for the $N_C$ transmission channels used for the data stream.

The unbiased variance of the SNR estimates may be computed as follows:

$$\sigma_\gamma^2 = \frac{1}{N_C - 1} \sum_{i=1}^{N_C} (\gamma_i - \gamma_{avg})^2, \qquad \text{Eq (3)}$$

where $\sigma_\gamma^2$ is the SNR variance.

A computation unit 212 then uses the average SNR and the SNR variance to compute an operating SNR for the group of transmission channels used for the data stream. The operating SNR may be computed as follows:

$$\gamma_{op} = \gamma_{avg} - \gamma_{bo}, \text{ (dB)} \qquad \text{Eq (4)}$$

where $\gamma_{bo}$ is a back-off factor; and
  $\gamma_{op}$ is the operating SNR for the group of transmission channels.

The back-off factor is used to account for frequency selectivity of the communication link (i.e., a non-flat frequency spectrum that results in variation in the received SNRs). The back-off factor may be a function of the average SNR, the SNR variance, and possibly other factors. The back-off factor is described in further detail below.

The system may be designed to support a set of transmission modes. Each supported transmission mode is associated with a particular minimum SNR required to achieve the desired level of performance, which is determined as described below.

A look-up table 214 may be used to store the set of supported transmission modes and the required SNR for each of these transmission modes. The operating SNR for the group of transmission channels used for the data stream is provided to look-up table 214, which then provides the transmission mode for the data stream. This transmission mode is the supported transmission mode with the highest data rate and a required SNR that is less than or equal to the operating SNR. Look-up table 214 thus selects the highest possible data rate for the data stream based on the operating SNR.

Table 1 lists an exemplary set of 14 transmission modes supported by the system, which are identified by transmission mode indices 0 through 13. Each transmission mode is associated with a particular spectral efficiency, a particular code rate, a particular modulation scheme, and the minimum SNR required to achieve 1% PER for a non-fading, AWGN channel. The spectral efficiency refers to the data rate (i.e., the information bit rate) normalized by the system bandwidth, and is given in units of bits per second per Hertz (bps/Hz). The code rate and modulation scheme for each transmission mode in Table 1 are specific to the exemplary system design. The transmission mode having index 0 is for a null data rate (i.e., no data transmission). For each transmission mode with a non-zero data rate, the required SNR is obtained based on the specific system design (i.e., the particular code rate, interleaving scheme, modulation scheme, and so on, used by the system for that transmission mode) and for an AWGN channel. The required SNR may be obtained by computation, computer simulation, empirical measurements, and so on, as is known in the art.

TABLE 1

| Transmission Mode Index | Spectral Efficiency (bps/Hz) | Code Rate | Modulation Scheme | Required SNR (dB) |
|---|---|---|---|---|
| 0 | 0.0 | — | — | — |
| 1 | 0.25 | 1/4 | BPSK | −1.8 |
| 2 | 0.5 | 1/2 | BPSK | 1.2 |
| 3 | 1.0 | 1/2 | QPSK | 4.2 |
| 4 | 1.5 | 3/4 | QPSK | 6.8 |
| 5 | 2.0 | 1/2 | 16 QAM | 10.1 |
| 6 | 2.5 | 5/8 | 16 QAM | 11.7 |
| 7 | 3.0 | 3/4 | 16 QAM | 13.2 |
| 8 | 3.5 | 7/12 | 64 QAM | 16.2 |
| 9 | 4.0 | 2/3 | 64 QAM | 17.4 |
| 10 | 4.5 | 3/4 | 64 QAM | 18.8 |
| 11 | 5.0 | 5/6 | 64 QAM | 20.0 |
| 12 | 6.0 | 3/4 | 256 QAM | 24.2 |
| 13 | 7.0 | 7/8 | 256 QAM | 26.3 |

FIG. 3 shows a flow diagram of a process 300 to determine the transmission mode for a data stream sent on a group of transmission channels with varying SNRs. Initially, an SNR estimate for each transmission channel used for the data stream is obtained (e.g., based on pilot symbols received on the transmission channel) (step 312). The SNR estimates for the transmission channels are given in units of dB. The average SNR for the group of transmission channels is then computed, as shown in equation (2) (step 314). The unbiased variance of the SNR estimates for the transmission channels is also computed, as shown in equation (3) (step 316). A back-off factor is then determined (e.g., based on the average SNR, the SNR variance, and/or other factors) (step 318). The operating SNR for the group of transmission channels is then computed based on the average SNR and the back-off factor, as shown in equation (4) (step 320).

A transmission mode is then determined for the data stream based on the operating SNR (step 322). A look-up table of supported transmission modes and their required SNRs may be consulted for step 322. Steps 312 through 322 may be performed for each of the $N_D$ data streams to be independently processed.

For clarity, the transmission mode selection process is now described for a specific example. In this example, a data stream is transmitted on a group of four transmission channels with received SNRs of 2.74, 4.27, 6.64, and 9.52 dB. The average SNR is computed as $\gamma_{avg}$=5.79 dB, and the SNR variance is computed as $\sigma_\gamma^2$=8.75. For this example, the back-off factor is determined based on a function $\gamma_{bo}$=$F(\gamma_{avg}, \sigma_\gamma^2)$=$0.25 \cdot \sigma_\gamma^2$ and computed as $\gamma_{bo}$=2.19 dB. The operating SNR is then computed as $\gamma_{op}$=5.79−2.19=3.60 dB.

Using the set of supported transmission modes and their required SNRs shown in Table 1, the transmission mode with mode index 2 is selected for the data stream. The selected transmission mode has the highest required SNR (of 1.2 dB) that is less than or equal to the operating SNR (of 3.60 dB).

The selected transmission mode indicates that a data rate of 0.5 bps/Hz, a code rate of ½, and BPSK modulation are to be used for the data stream.

The average SNR represents an estimate of the transmission capacity of the group of transmission channels, which is an accurate estimate for an AWGN channel and a not so accurate estimate for a multipath channel. The average SNR may be used to select the transmission mode for the data stream sent on these transmission channels. The selected transmission mode represents a prediction of the data rate that can be supported by the group of transmission channels for the desired PER. However, as with any prediction scheme, there will inevitably be prediction errors. In order to ensure that the desired PER can be achieved, a back-off factor may be used. Since the back-off reduces the throughput of the system, it is desirable to keep this back-off as small as possible while still ensuring that the desired PER can be achieved.

The back-off factor may be determined based on various factors. One such factor is the amount of variability in the SNR estimates for the group of transmission channels, which is quantified by the SNR variance, $\sigma_\gamma^2$. A larger back-off factor may be used for larger SNR variance, to account for higher likelihood of prediction error. Conversely, the back-off factor approaches zero as the SNR variance reduces to zero, so that no back-off is needed for an AWGN channel with $\sigma_\gamma^2=0$.

The back-off factor may also be determined based on system specific factors, such as the diversity, coding scheme, and interleaving scheme used for the data stream. Diversity may be provided in the time, frequency, and/or spatial domains. Spatial diversity may be attained for the data stream through the use of multiple transmit antennas (transmit diversity) and/or multiple receive antennas (receive diversity). Interleaving may be used to achieve time, frequency, and/or spatial diversity, depending on the manner in which the interleaved bits are mapped. The type of coding scheme, as well as the constraint length, K, of the code, used for the data stream also have an impact on the back-off factor. The performance of convolutional codes is more sensitive to puncturing and variability in SNR, and a larger back-off factor may be used for these codes. Conversely, the performance of turbo codes is less sensitive to puncturing, and a smaller back-off factor may be used for these codes. The packet size also has an impact on the back-off factor, and a larger back-off factor may be needed for a larger packet size to achieve the desired PER. The back-off factor may be determined in various manners, some of which are described below.

In one embodiment, the back-off factor is computed as a function of the average SNR and the SNR variance, as follows:

$$\gamma_{bo}=F(\gamma_{avg},\sigma_\gamma^2).(dB) \quad\quad Eq\ (5)$$

Equation (5) indicates that the back-off factor may be a function of the average SNR, or the SNR variance, or both the average SNR and SNR variance, or neither. Equation (5) is thus a generic form of the function for the back-off factor.

A specific function for the back-off factor, which is a function of the SNR variance, may be expressed as follows:

$$\gamma_{bo}=F(\sigma_\gamma^2)=K_b\cdot\sigma_\gamma^2,(dB) \quad\quad Eq\ (6)$$

where $K_b$ is a scaling factor.

The scaling factor $K_b$ is selected based on various system specific factors and typically ranges from 0 to 1 (i.e., $1 \geq K_b \geq 0$). The scaling factor $K_b$ may be a function of the minimum free distance, $d_{min}$, of the specific code used by the system. The general concept of $d_{min}$ is well known in the art, and the $d_{min}$ of any given code is either known or may be ascertained in a manner known in the art. The scaling factor $K_b$ may be smaller for turbo codes and larger for convolutional codes. For a given type of code (i.e., convolutional or turbo), the constraint length K of the code also has an impact on the scaling factor. A smaller scaling factor may be used for a larger constraint length, and vice versa. For a given system design, the scaling factor $K_b$ may be determined based on simulation (for a large number of realizations), empirical measurements, and so on.

In another embodiment, the back-off factor is computed based on a set of factors. A function F(x) may be defined, where x represents a set of parameters or factors to be considered (e.g., average SNR, SNR variance, coding scheme, interleaving, diversity, packet size, and so on).

In yet another embodiment, a fixed back-off factor is used (i.e., not dependent on the average SNR or the SNR variance). This fixed back-off factor may provide good performance for some system designs (e.g., systems with large diversity order, turbo codes, and so on).

The use of the transmission mode selection techniques described above for various types of multi-channel communication system is described below.

1. OFDM System

For an OFDM system, the channel response across the system bandwidth may be given by $\{h(k)\}$, for $k=1, 2, \ldots N_F$, where $N_F$ is the number of subbands. It is assumed that $h(k)$ is flat across the subband k. For a multipath channel, the channel response $\{h(k)\}$ varies across the system bandwidth but the noise variance $N_0$ is typically constant. These parameters may be used to compute the received SNR for each of the $N_F$ subbands. If the total transmit power, $P_{total}$, for the OFDM system is uniformly distributed across the $N_F$ subbands, then the received SNR of each subband may be expressed as:

$$\gamma(k) = 10\log_{10}\left(\frac{P_{total}}{N_F}\frac{|h(k)|^2}{N_0}\right), \text{for } k \in K, (dB) \quad\quad Eq\ (7)$$

where $\gamma(k)$ is the received SNR for subband k and $K=\{1, 2, \ldots N_F\}$. Equation (7) represents an exemplary method of computing the received SNR in an OFDM system. The received SNR may also be computed in other manners known in the art.

Figure 4:
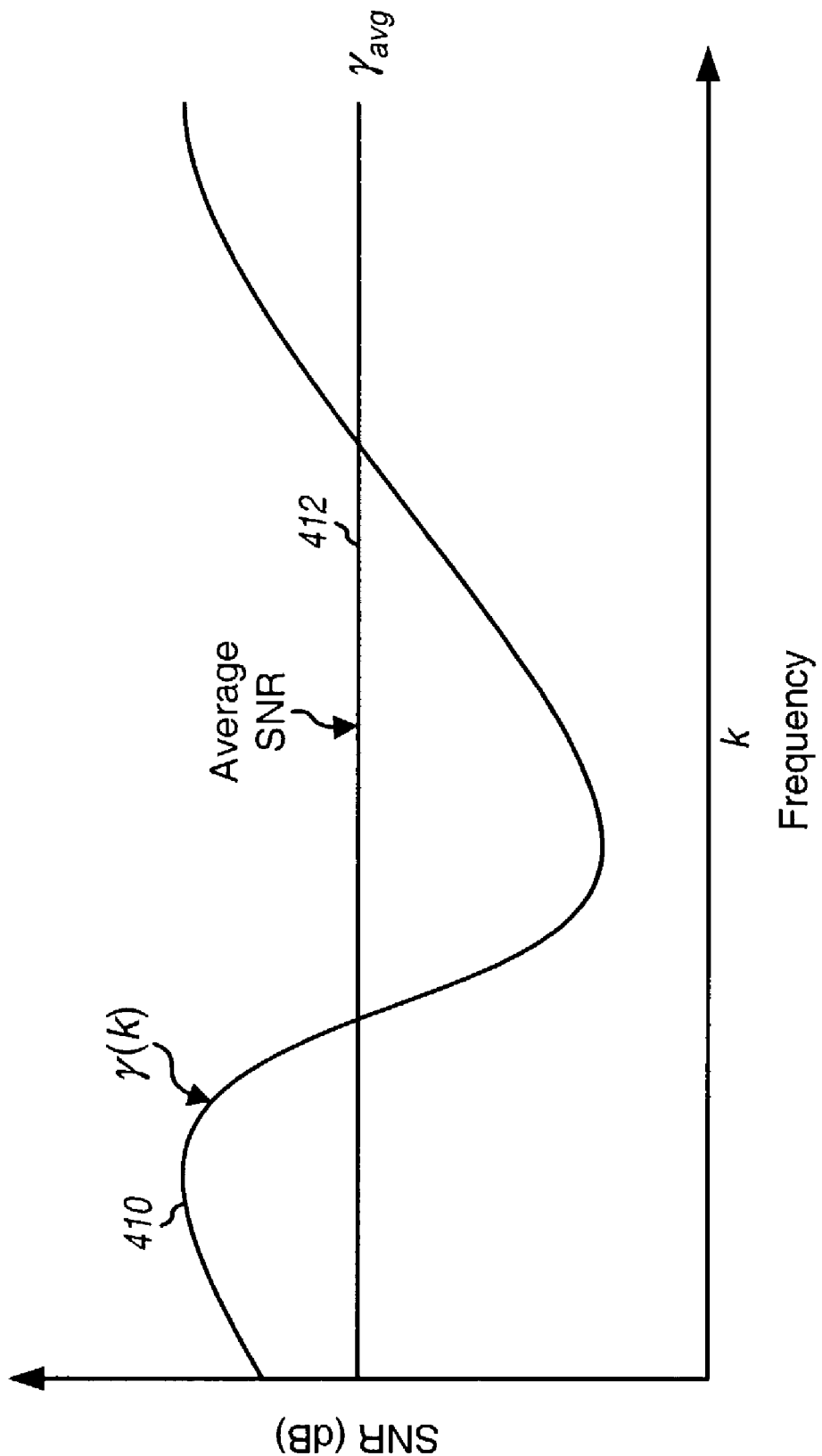
FIG. 4 shows the SNR of an OFDM system with frequency selective fading.

FIG. 4 shows an exemplary plot 410 of the received SNR for an OFDM system with frequency selective fading. For a multipath channel with channel gains that vary across the system bandwidth, different received SNRs are achieved for different subbands, as shown by plot 410. The received SNRs of all subbands used for data transmission may be averaged to obtain the average SNR, $\gamma_{avg}$, which is shown by a plot 412.

2. OFDMA System

An orthogonal frequency division multiple-access (OFDMA) communication system can support multiple users simultaneously through frequency domain multiplexing. In an OFDMA system, each user is assigned a specific set of subbands that is disjoint from the sets of subbands assigned to other users (i.e., each subband is assigned to only one user, if at all). Multiple users may concurrently transmit and/or receive data via their assigned sets of subbands. Each user may transmit and/or receive one or multiple data streams on the assigned set of subbands. The transmission mode selection techniques described above may be individually performed for each user based on the received SNRs achieved for the assigned set of subbands.

3. SIMO-OFDM System

For a single-input multiple-output (SIMO) communication system, $N_R$ receive antennas are used to receive a data transmission sent from a single transmit antenna. The channel response between the single transmit antenna and the $N_R$ receive antennas may be represented as h(k) or $\{h_j(k)\}$, for $j=1, 2, \ldots N_R$ and $k=1, 2, \ldots N_F$, where $h_j(k)$ is the channel gain between the transmit antenna and receive antenna j for subband k.

The SNR function for a $(1, N_R)$ SIMO-OFDM system is similar to that for an OFDM system, except that the received SNR for the SIMO-OFDM system is obtained by a summation of the received SNRs for all of the $N_R$ received antennas. The received SNR for each subband in the SIMO-OFDM system may be expressed as:

$$\gamma(k) = 10\log_{10}\left(\frac{\sum_{j=1}^{N_R} |h_j(k)|^2}{N_0}\right), \text{ for } k \in K, \text{ (dB)} \quad \text{Eq (8)}$$

where the transmit power for each subband is normalized to 1. Equation (8) represents an exemplary method of computing the received SNR in a SISO-OFDM system. For simplicity, equation (8) assumes that the same noise variance $N_0$ is received on all $N_R$ receive antennas. Equation (8) may be modified to account for different noise variances $N_0$ received on different receive antennas. The received SNR may also be computed in other manners known in the art.

For the SIMO-OFDM system, the received SNRs determined based on equation (8) for the $N_F$ subbands may be used for transmission mode selection. Except for the change in the computation of the received SNRs, the transmission mode selection for the SIMO-OFDM system may be performed in similar manner as for the OFDM system.

4. MIMO System

For a MIMO system, multiple spatial channels are formed by the $N_T$ transmit antennas and $N_R$ receive antennas used for data transmission. Spatial processing is performed at the receiver and may also be performed at the transmitter to allow for simultaneous data transmission on all spatial channels. The spatial processing at the receiver also provides a channel response matrix H for the MIMO channel. The elements of the channel response matrix H are $\{h_{j,i}\}$, for $j=1, 2, \ldots N_R$ and $i=1, 2, \ldots N_T$, where $h_{j,i}$ is the coupling or channel gain between transmit antenna i and receive antenna j. The MIMO channel may be assumed to be a flat-fading narrowband channel. In this case, the elements of the channel response matrix H are scalars, and the coupling $h_{j,i}$ between each transmit-receive antenna pair can be represented by a single scalar value.

The channel response matrix H may be decomposed using singular value decomposition or eigenvalue decomposition, both of which are known in the art, to determine the spatial channels of the MIMO channel. The SNR of each spatial channel may then be determined based on the result of the decomposition. A suitable transmission mode may be selected for data transmission on multiple spatial channels based on their received SNRs.

5. MIMO-OFDM System

For a MIMO-OFDM system, a channel response matrix H(k) may be obtained for each of the $N_F$ subbands. Data transmission may occur on all $N_F$ subbands of all $N_T$ transmit antennas.

The model for a MIMO-OFDM system may be expressed as:

$$y(k)=H(k)x(k)+n, \text{for } k \in K, \quad \text{Eq (9)}$$

where $y(k)=[y_1(k)\, y_2(k) \ldots y_{N_R}(k)]^T$ is a vector of $N_R$ received symbols for subband k, where $y_j(k)$ is the entry received on subband k of receive antenna j;

$x(k)=[x_1(k)\, x_2(k) \ldots x_{N_T}(k)]^T$ is a vector of $N_T$ transmit symbols for subband k, where $x_i(k)$ is the entry sent on subband k of transmit antenna i;

H(k) is the channel response matrix for subband k; and n is additive white Gaussian noise (AWGN) with zero mean and a covariance matrix of $\underline{\Lambda}_n = N_0 I$, where I is the identity matrix.

For simplicity, the effects of the OFDM processing at both the transmitter and receiver (which may be negligible) are not shown in equation (9).

For the MIMO-OFDM system, data may be processed and transmitted using numerous transmission schemes. Each transmission scheme may designate (1) the manner in which data is processed (i.e., encoded, interleaved, and modulated) prior to transmission, (2) the spatial processing at the transmitter (if any) and the receiver, and (3) the transmission channels to use for each independently processed data stream. Some exemplary transmission schemes are described below.

A. All-Antenna Transmission Scheme

For the all-antenna transmission (AAT) scheme, one data stream is transmitted on all subbands of all transmit antennas. For this scheme, the data to be transmitted is first encoded, interleaved, and modulated using a common coding and modulation scheme to obtain modulation symbols. The modulation symbols are then demultiplexed into $N_T$ modulation symbol streams s for the $N_T$ transmit antennas. For the AAT scheme, spatial processing is not performed at the transmitter, and the $N_T$ transmit symbol streams are equal to the $N_T$ modulation symbol streams (i.e., x=s). Each transmit symbol stream is sent from one transmit antenna and corresponds to one of the $N_T$ entries in the vector x in equation (9).

Due to scattering in the propagation environment, the $N_T$ transmit symbol streams sent from the $N_T$ transmit antennas on a given subband k interfere with each other at the receiver according to the channel response matrix at that subband, H(k). In particular, a given transmit symbol stream sent from one transmit antenna may be received by all $N_R$ receive antennas at different amplitudes and phases. The received symbol stream for each receive antenna may then include a component of each of the $N_T$ transmit symbol streams. The $N_R$ received symbol streams would collectively include all $N_T$ transmit symbols streams. However, these $N_T$ transmit symbol streams are dispersed among the $N_R$ received symbol streams.

Spatial and space-time receiver processing techniques may be used to separate out and recover the transmit symbol streams at the receiver. Each transmit symbol stream may be recovered by (1) combining the various components of that transmit symbol stream in the $N_R$ received symbol streams, based on an estimate of the channel response and (2) removing or canceling the interference due to the other transmit symbol streams. Each receiver processing technique attempts to either (1) decorrelate the individual transmit symbol streams such that there is no interference from the other transmit symbol streams or (2) maximize the SNR of each recovered symbol stream in the presence of noise and interference from the other symbol streams. Each recovered symbol stream is further processed (e.g., demodulated, deinterleaved, and decoded) to obtain decoded data.

One spatial receiver processing technique that may be used to recover the transmit symbol streams is a linear zero-forcing (ZF) equalizer. The linear ZF equalizer has a response of $W_{ZF}(k)$, which may be obtained as:

$$W_{ZF}(k) = H(k)(H^H(k)H(k))^{-1}, \text{ for } k \in K. \quad \text{Eq (10)}$$

The recovered symbol streams $\hat{x}$, which are estimates of the transmit symbol streams x, may be obtained as:

$$\hat{x}(k) = W_{ZF}^H(k)y(k) = x(k) + W_{ZF}^H(k)n, \text{ for } k \in K. \quad \text{Eq (11)}$$

As shown in the right-hand side of equation (11), the recovered symbol streams $\hat{x}$ contain the transmit symbol streams x plus filtered noise $W_{ZF}^H(k)n$, which is in general correlated with a covariance matrix $\Sigma_n = N_o W_{ZF}^H W_{ZF}$.

Other spatial and space-time receiver processing techniques may also be used to recover the transmit symbol streams, and this is within the scope of the invention. Some of these other receiver processing techniques are described in U.S. patent application Ser. No. 09/993,087, entitled "Multiple-Access Multiple-Input Multiple-Output (MIMO) Communication System," filed Nov. 6, 2001, and assigned to the assignee of the present application.

For the AAT scheme, with linear ZF equalizer at the receiver, the received SNR for each subband of each transmit antenna may be expressed as:

$$\gamma_j(k) = 10\log_{10}\left(\frac{|w_j^H(k)\underline{h}_j(k)|^2}{N_0}\right), \text{ for } k \in K \text{ and } j \in J, \text{ (dB)} \quad \text{Eq (12)}$$

where $w_j(k)$ is the j-th column of $W_{ZF}(k)$, $\gamma_j(k)$ is the received SNR for subband k of transmit antenna j, and $J = \{1, 2, \ldots N_R\}$. Equation (12) represents an exemplary method of computing the received SNR in a MIMO-OFDM system whereby a linear ZF equalizer is used at the receiver. In general, the received SNR is dependent on the particular receiver processing technique selected for use, and may be computed in other manners known in the art.

Figure 5A:
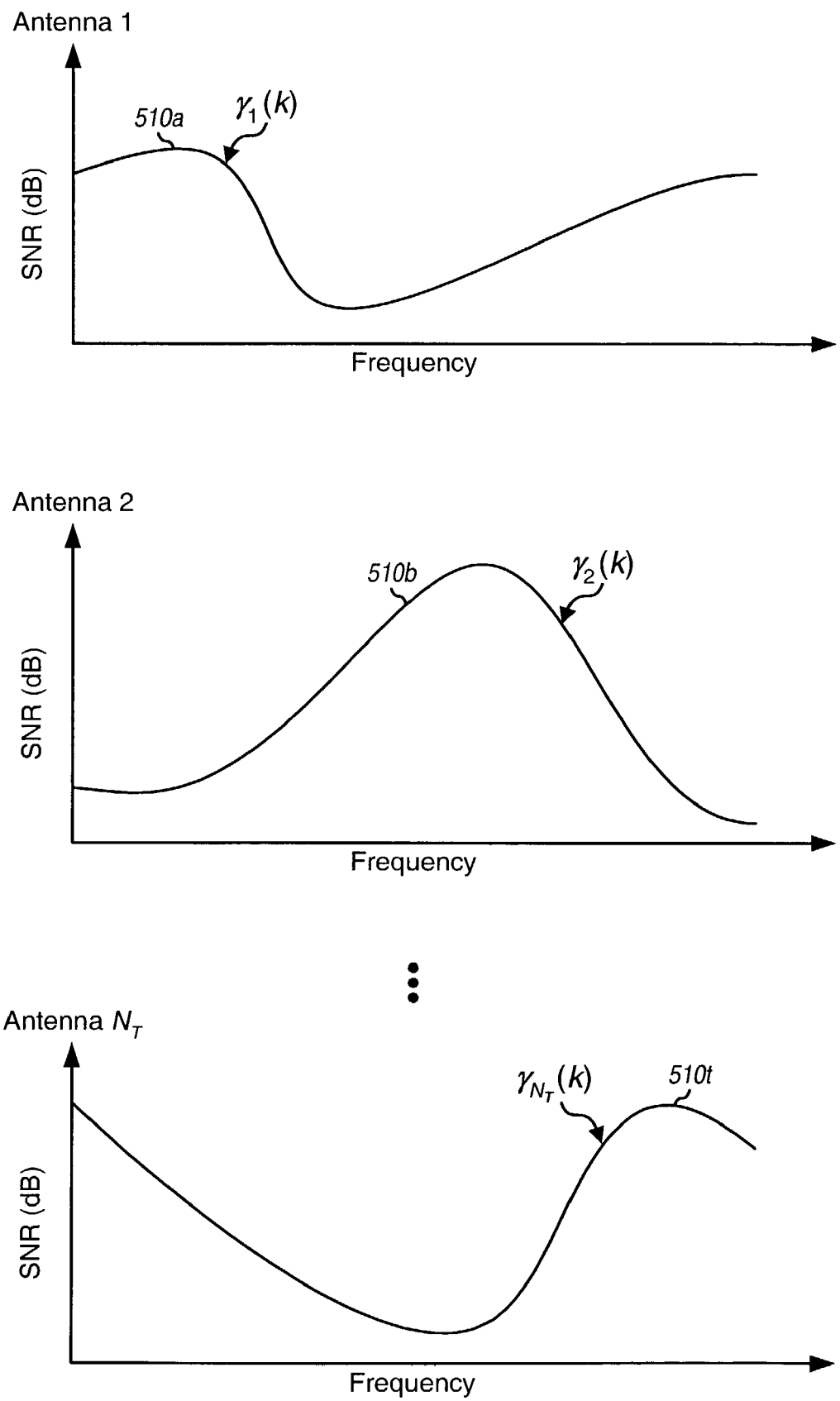
FIGS. 5A and 5B show the SNRs of $N_T$ transmit antennas in a MIMO-OFDM system and the SNR of an equivalent system, respectively.

FIG. 5A shows exemplary plots of the received SNRs for the $N_T$ transmit antennas in a MIMO-OFDM system with frequency selective fading. The channel response of each transmit antenna j is given by $h_j(k)$, for $k \in K$ and $j \in J$, where $h_j(k)$ is the j-th column of the matrix $H(k)$ and includes $N_R$ elements for the $N_R$ receive antennas. For each transmit antenna j with channel response of $h_j(k)$ and noise variance of $N_0$, a plot 510 of the received SNRs for the $N_F$ subbands may be computed as shown in equation (12). As shown in FIG. 5A, the received SNR plots 510a through 510t for the $N_T$ transmit antennas may be different because of independent fading for these transmit antennas.

Figure 5B:
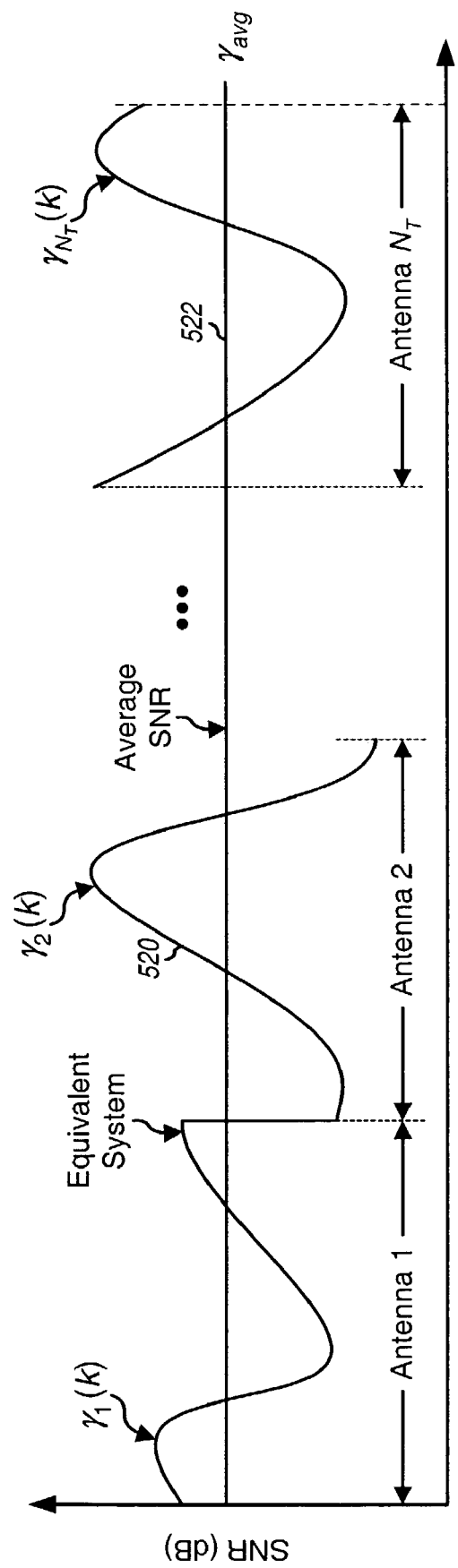

FIG. 5B shows a plot 520 of the received SNRs in an equivalent system used to model the MIMO-OFDM system shown in FIG. 5A. The equivalent system has an SNR response that is formed by the concatenation of the $N_T$ received SNR plots 510a through 510t. An average SNR and an SNR variance may be computed for the equivalent system in the manner described above. The average SNR and SNR variance may then be used to determine the transmission mode for data transmission on the $N_F$ subbands of the $N_T$ transmit antennas, as described above.

B. Per-Antenna Transmission Scheme

For the per-antenna transmission (PAT) scheme, one data stream is transmitted on all subbands of each transmit antenna. For this scheme, the data to be transmitted is first demultiplexed into $N_T$ data streams for the $N_T$ transmit antennas. Each data stream is then independently coded, interleaved, and modulated to provide a corresponding stream of modulation symbols. The data rate and the coding and modulation schemes may be the same or different for the $N_T$ data streams. For the PAT scheme, spatial processing is not performed at the transmitter, and the $N_T$ transmit symbol streams are equal to the $N_T$ modulation symbol streams (i.e., x=s). Each transmit symbol stream is sent from one transmit antenna and corresponds to one of the $N_T$ entries in the vector x in equation (9).

At the receiver, the $N_T$ modulation symbol streams may be recovered using a spatial or space-time receiver processing technique. The receiver may utilize a linear zero-forcing (ZF) equalizer or some other type of equalizer. If the linear ZF equalizer is used, then the response $W_{ZF}(k)$ of this equalizer may be determined as shown in equation (10) and used to recover the transmit symbol streams as shown in equation (11). The received SNR for each transmit antenna may then be computed as shown in equation (12).

Alternatively, the $N_T$ transmit symbol streams may be recovered using a successive nulling/equalization and interference cancellation receiver processing technique, which is also referred to as a successive interference cancellation (SIC) processing technique. The SIC processing technique attempts to recover the $N_T$ transmit symbol streams, one stream at each stage, using spatial or space-time receiver processing. As each transmit symbol stream is recovered, the interference caused by the recovered symbol stream on the remaining not yet recovered transmit symbol streams is estimated and cancelled from the received symbol streams to obtain modified symbol streams. The modified symbol streams are then processed by the next stage to recover the next transmit symbol stream.

The $N_T$ transmit symbol streams may be recovered in various orders. In general, the transmit symbol stream recovered by the first stage experiences the most interference and achieves the worst possible received SNR for that stream, and the transmit symbol stream recovered by the last stage experiences the least interference and achieves the best possible received SNR for that stream. For simplicity, the following description assumes that the $N_T$ transmit symbol streams are recovered in an ascending order (i.e., the transmit symbol stream sent from transmit antenna 1 is recovered first, the transmit symbol stream sent from transmit antenna 2 is recovered next, and so on).

For the l-th stage of a SIC receiver, to recover the transmit symbol stream sent from the l-th transmit antenna, where $l \in L$ and $L = \{1, 2, \ldots N_T\}$, the interference from the (l−1) prior recovered symbol streams is assumed to be canceled. The interference from the other ($N_T$−l) not yet recovered transmit symbol streams may be minimized (i.e., nulled out) with a proper match filter $w_l(k)$ for the transmit symbol stream to be recovered in this stage. The match filter $w_l(k)$ includes $N_R$ elements for the $N_R$ receive antennas, with each element being a vector of $N_F$ coefficients for the $N_F$ subbands. Each stage of the SIC receiver thus resembles a (1, $N_R$) SIMO-OFDM system.

The match filter $w_l(k)$ for the l-th stage may be obtained based on a reduced channel response matrix $H_l(k)$ for that stage. Since one transmit symbol stream is recovered and canceled in each stage, the channel response matrix $H(k)$ is reduced by one column for each stage. For the l-th stage, the reduced channel response matrix $H_l(k)$ is an ($N_R \times (N_T - l + 1)$) matrix, with (l−1) columns for the transmit antennas of the (l−1) prior recovered symbol streams removed from the original matrix $H(k)$.

The ZF equalizer response matrix $W_{ZF,l}(k)$ for the l-th stage may be derived based on the reduced channel response matrix $H_l(k)$, as shown in equation (10). However, since $H_l(k)$ is different for each stage, $W_{ZF,l}(k)$ is also different for each stage. The match filter $w_l(k)$ for the transmit symbol stream to be recovered in the l-th stage may be expressed as $w_l(k) = w_{ZF,l}(k)$, where $w_{ZF,l}(k)$ corresponds to the l-th transmit antenna and is the first column of the ZF equalizer response matrix $W_{ZF,l}(k)$ derived for the l-th stage.

The recovered symbol stream, $\hat{x}_l$, for the l-th transmit antenna may then be obtained as:

$$\hat{x}_l(k) = w_l^H(k) y_l(k) = w_l^H(k) h_l(k) x_l(k) + w_l^H(k) n, \qquad \text{Eq (13)}$$

where $x_l(k)$ denotes the transmit symbol stream being recovered in the l-th stage; and $y(k)$ denotes the modified received symbol streams for the l-th stage, with the interference due to the (l−1) prior recovered symbol streams removed.

The spatial or space-time processing for the l-th stage of the SIC receiver can provide $(N_T − l + 1)$ recovered symbol streams, $\{\hat{x}_j\}$ for $j = l, l+1, \ldots N_T$. One of the $(N_T − l + 1)$ recovered symbol streams (e.g., the one corresponding to the l-th transmit antenna) is selected for further processing to obtain the decoded data for that symbol stream. The SIC processing technique is described in further detail in the aforementioned U.S. patent application Ser. No. 09/993,087 and in U.S. patent application Ser. No. 10/176,567, entitled "Rate Control for Multi-Channel Communication Systems," filed Jun. 20, 2002, and assigned to the assignee of the present application.

Typically, an important consideration for a SIC receiver is the order in which the transmit symbol streams are recovered. If the same transmission mode is used for all $N_T$ transmit antennas, then for each stage the recovered symbol stream that attains the highest received SNR may be selected for decoding. However, with the transmission mode selection techniques described herein, the transmission modes for the transmit antennas may be individually selected.

For the PAT scheme, with linear ZF equalizer at the receiver, the received SNR for each subband of each transmit antenna may be expressed as:

$$\gamma_l(k) = 10 \log_{10}\left(\frac{|w_l^H(k) h_l(k)|^2}{N_0}\right), \text{ for } k \in K \text{ and } l \in L, \text{ (dB)} \qquad \text{Eq (14)}$$

where $\gamma_l(k)$ is the received SNR for subband k of transmit antenna l; and $w_l(k)$ is obtained based on the ZF equalizer response matrix $W_{ZF,l}(k)$ for the l-th stage.

Figure 6:
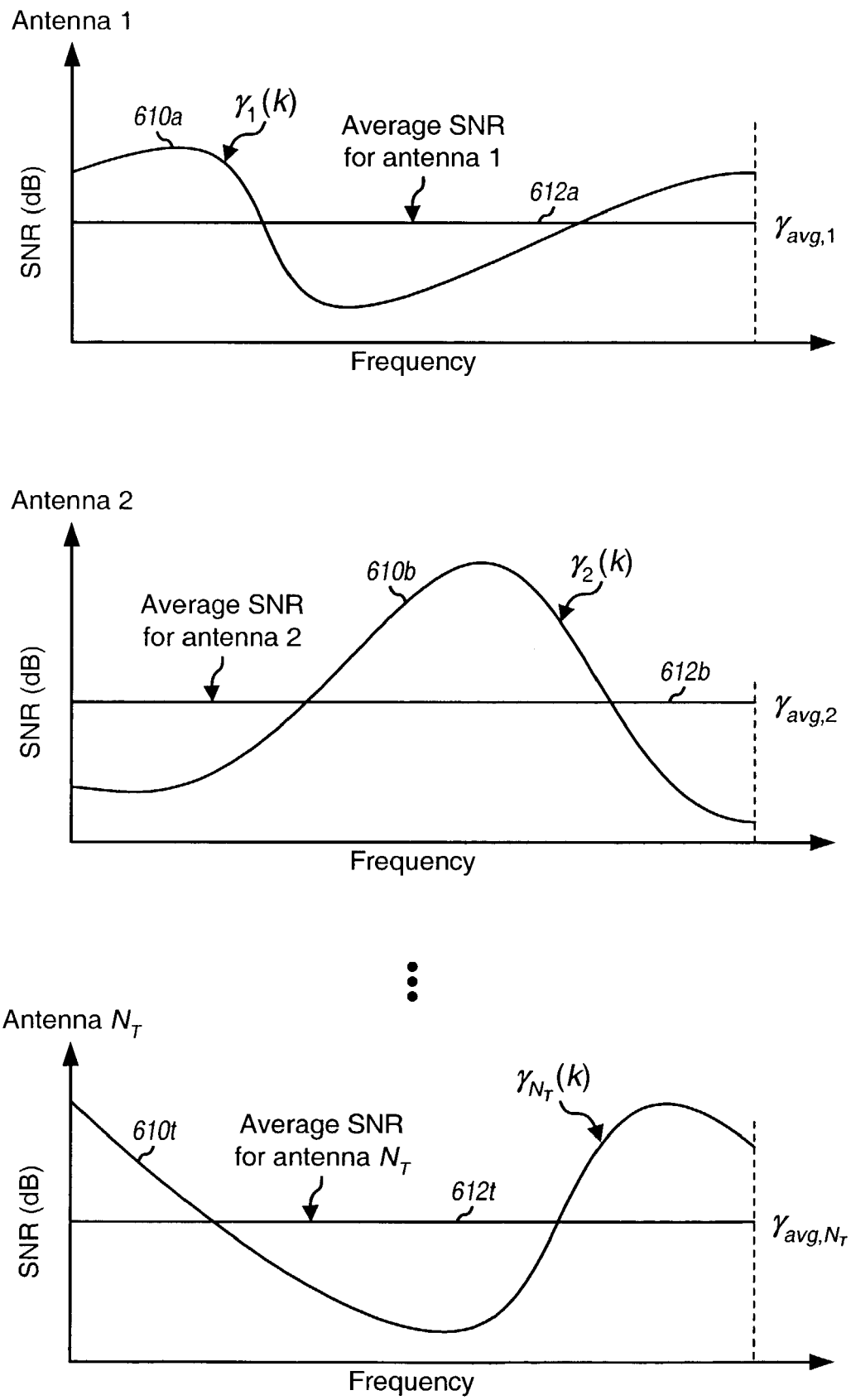
FIG. 6 shows the average SNRs of the $N_T$ transmit antennas.

Equation (14) represents an exemplary method of computing the received SNR in a MIMO-OFDM system with a SIC receiver that uses a linear ZF equalizer. Again, the received SNR is dependent on the particular receiver processing technique selected for use, and may be computed in other manners known in the art FIG. 6 shows exemplary plots of the received SNRs for the $N_T$ transmit antennas in a MIMO-OFDM system with frequency selective fading. For each transmit antenna, a plot 610 of the received SNRs for $N_F$ subbands may be computed as shown in equation (14) based on the channel response $h_l(k)$, the matched filter $w_l(k)$, and the noise variance $N_0$. As shown in FIG. 6, the received SNR plots 610a through 610t for the $N_T$ transmit antennas may be different because of independent fading for these transmit antennas. An average SNR and an SNR variance may be computed for each transmit antenna based on the received SNRs for the $N_F$ subbands of that transmit antenna. The average SNR and SNR variance for each transmit antenna may then be used to determine a suitable transmission mode for data transmission on the $N_F$ subbands of that transmit antenna, as described above. For the PAT scheme, transmission mode selection may be performed independently for each of the $N_T$ data streams sent from the $N_T$ transmit antennas.

C. Per-Eizenmode Transmission Scheme

For the per-eigenmode transmission (PET) scheme, one data stream is sent on each wideband eigenmode (described below). For this scheme, the data to be transmitted is first demultiplexed into $N_T$ data streams for the $N_T$ wideband eigenmodes (assuming $N_S = N_T$). Each data stream is then independently coded, interleaved, and modulated to provide a corresponding modulation symbol stream. The data rate and coding and modulation schemes may be the same or different for the $N_T$ data streams. The $N_T$ modulation symbol streams are then spatially processed at the transmitter to obtain $N_T$ transmit symbol streams for the $N_T$ transmit antennas.

The channel response matrix $H(k)$ for each subband may be decomposed to obtain the $N_T$ eigenmodes for that subband. This may be achieved by performing either singular value decomposition on $H(k)$ or eigenvalue decomposition on the correlation matrix of $H(k)$, which is $R(k) = H^H(k) H(k)$. The singular value decomposition on $H(k)$ may be expressed as:

$$H(k) = U(k) \Sigma(k) V^H(k), \text{ for } k \in K, \qquad \text{Eq (15)}$$

where $U(k)$ is an $(N_R \times N_R)$ unitary matrix of left eigenvectors of $H(k)$;

$\Sigma(k)$ is an $(N_R \times N_T)$ diagonal matrix of singular values of $H(k)$; and $V(k)$ is an $(N_T \times N_T)$ unitary matrix of right eigenvectors of $H(k)$.

A unitary matrix is characterized by the property $M^H M = I$. Singular value decomposition is described by Gilbert Strang in a book entitled "Linear Algebra and Its Applications," Second Edition, Academic Press, 1980.

The singular values in each diagonal matrix $\Sigma(k)$, for $k \in K$, may be ordered such that the first column contains the largest singular value, the second column contains the next largest singular value, and so on (i.e., $\sigma_1 \geq \sigma_2 \geq \ldots \geq \sigma_{N_T}$ where $\sigma_i$ is the eigenvalue in the i-th column of $\Sigma(k)$ after the ordering). When the singular values for each matrix $\Sigma(k)$ are ordered, the eigenvectors (or columns) of the associated unitary matrices $V(k)$ and $U(k)$ for that subband are also ordered correspondingly. A wideband eigenmode may be defined as the set of same-order eigenmodes for all $N_F$ subbands after the ordering (i.e., the m-th wideband eigenmode includes the m-th eigenmode of all $N_F$ subbands). The principal wideband eigenmode includes the largest singular value in each matrix $\Sigma(k)$ after the ordering. (A wideband eigenmode may also be referred to as a spatial channel.)

The ordering typically results in the singular values for the principal wideband eigenmode having less variability (i.e., smaller SNR variance) and the singular values for the worst wideband eigenmode having more variability. This is advantageous since smaller back-off factors would be required for the better wideband eigenmodes with higher transmission capacities.

The spatial processing performed by the transmitter on the $N_T$ modulation symbol streams s to obtain the $N_T$ transmit symbol streams x may be expressed as:

$$x(k)=V(k)s(k), \text{ for } k \in K. \quad \text{Eq (16)}$$

At the receiver, the $N_R$ received symbol streams y may be processed to recover the $N_T$ modulation symbol streams, as follows:

$$\hat{s}(k)=\Sigma^{-1}(k)U^H(k)y(k)=s(k)+\Sigma^{-1}(k)U^H(k)n, \text{ for } k \in K. \quad \text{Eq (17)}$$

The spatial processing at the transmitter and the receiver for the PET scheme is described in detail in the aforementioned U.S. patent application Serial No. 09/993,087 and in provisional U.S. Application Serial No. 60/421,309, entitled "MIMO WLAN System," filed on Oct. 25, 2002, and assigned to the assignee of the present application.

For the PET scheme, the received SNR for each subband of each wideband eigenmode may be expressed as:

$$\gamma_m(k) = 10\log_{10}\left(\frac{\sigma_m^2(k)}{N_0}\right), \text{ for } k \in K \text{ and } m = 1, 2, \ldots N_T, \text{(dB)} \quad \text{Eq (18)}$$

where $\sigma_m(k)$ is the singular value for subband k of wideband eigenmode m; and $\gamma_m(k)$ is the received SNR for subband k of wideband eigenmode m.

Equation (18) assumes a normalized transmit power of 1.0 is used for each wideband eigenmode. Equation (18) represents an exemplary method of computing the received SNR in a MIMO-OFDM system that transmits data on wideband eigenmodes. The received SNR may also be computed in other manners known in the art.

The received SNRs for the $N_T$ wideband eigenmodes for the PET scheme may be plotted in similar manner as that shown in FIG. 6 for the PAT scheme. An average SNR and an SNR variance may be computed for each wideband eigenmode based on the SNRs computed for the $N_F$ subbands of that wideband eigenmode. The average SNR and SNR variance for each wideband eigenmode may then be used to determine a suitable transmission mode for data transmission on the $N_F$ subbands of that wideband eigenmode. For the PET scheme, transmission mode selection may be performed independently for each of the $N_T$ data streams respectively sent on the $N_T$ wideband eigenmodes.

D. Beam-Steering Scheme

For a beam-steering scheme, one data stream is transmitted on the principal wideband eigenmode at full power and using the phase information from the principal eigenvectors $v_1(k)$ for $k \in K$, for this wideband eigenmode. For this scheme, the data stream is first processed to obtain a modulation symbol stream, which is then spatially processed at the transmitter to obtain $N_T$ transmit symbol streams for the $N_T$ transmit antennas. The processing at the transmitter and receiver for the beam-steering scheme is described in detail in provisional U.S. Patent Application Serial No. 60/421,428, entitled "Channel Estimation and Spatial Processing for TDD MIMO Systems," filed Oct. 25, 2002, and assigned to the assignee of the present application.

E. Diversity Transmission Schemes

For a diversity transmission scheme, one data stream is sent from multiple subbands and/or transmit antennas to achieve higher reliability. Various diversity transmission schemes may be implemented for MIMO and MIMO-OFDM systems, some of which are described below. These schemes attempt to achieve transmit diversity by establishing orthogonality among multiple signals sent from multiple transmit antennas. Orthogonality among the transmitted signals may be attained in frequency, time, space, or any combination thereof.

For a frequency diversity scheme, a data stream is processed to obtain a stream of modulation symbols, and each modulation symbol is transmitted on multiple subbands to combat frequency selective fading. For a MIMO-OFDM system, each modulation symbol may also be transmitted from multiple antennas to achieve spatial diversity. In general, each modulation symbol may be sent on any number of subbands and any number of transmit antennas. More subbands and/or transmit antennas correspond to greater redundancy and improved likelihood of correct reception at the receiver at the expense of reduced efficiency.

For a Walsh diversity scheme, a data stream is processed to obtain a stream of modulation symbols, which is then redundantly sent from multiple transmit antennas. To achieve orthogonality among the signals transmitted from multiple transmit antennas, the modulation symbols are time spread with a different orthogonal function or code for each of the multiple transmit antennas. The orthogonal functions may be Walsh functions, orthogonal variable spreading factor (OVSF) codes, and so on.

For a space-time transmit diversity (STTD) scheme, two independent symbol streams are simultaneously sent from two transmit antennas while maintaining orthogonality at the receiver. The two symbol streams may include modulation symbols from one or two data streams. The STTD scheme operates as follows. Suppose that two modulation symbols, denoted as $s_1$ and $s_2$, are to be transmitted on a given subband at separate times. The transmitter generates two vectors, $x_1 = [s_1 \, s_2^*]^T$ and $x_2 = [s_2 \, -s_1^*]^T$. Each vector includes two elements that are to be transmitted sequentially in two OFDM symbol periods from a respective transmit antenna (i.e., vector $x_1$ is transmitted from antenna 1 and vector $x_2$ is transmitted from antenna 2).

A Walsh-STTD scheme employs a combination of Walsh diversity and STTD described above. The Walsh-STTD scheme may be used in systems with more than two transmit antennas. For a repeated Walsh-STTD scheme, two transmit vectors $x_1 = [s_1 \, s_2^*]^T$ and $x_2 = [s_2 \, -s_1^*]^T$ are generated for each pair of modulation symbols to be transmitted on a given subband from two transmit antennas. These two transmit vectors are also repeated across multiple pairs of transmit antennas using Walsh functions to achieve orthogonality across the multiple transmit antenna pairs and to provide additional transmit diversity. For a non-repeated Walsh-STTD scheme, a pair of transmit vectors $x_1 = [s_1 \, s_2^*]^T$ and $x_2 = [s_2 \, -s_1^*]^T$ is generated for each pair of modulation symbols to be transmitted on a given subband from two transmit antennas. Multiple pairs of transmit vectors may be generated for multiple pairs of transmit antennas (e.g., $x_1$ and $x_2$ may be generated for one transmit antenna pair, and $x_3 = [s_3 \, s_4^*]^T$ and $x_4 = [s_4 \, -s_3^*]^T$ may be generated for another transmit antenna pair). Each pair of transmit vectors is processed with a different Walsh function to achieve orthogonality across the multiple transmit antenna pairs.

The frequency diversity scheme, Walsh diversity scheme, STTD scheme, and Walsh-STTD scheme, and the processing at the transmitter and receiver for these diversity schemes, are described in detail in U.S. patent application Ser. No. 10/179,439, entitled "Diversity Transmission Modes for MIMO OFDM Communication System," filed Jun. 24, 2002, and assigned to the assignee of the present application. The diversity transmission schemes may be used for various scenarios such as (1) to achieve higher reliability for overhead channels (e.g., broadcast, paging, and other common channels), (2) whenever information for the communication link is not available to use a more spectrally efficient transmission scheme, (3) when the channel conditions are sufficiently poor (e.g., under certain mobility conditions) and cannot support a more spectrally efficient transmission scheme, and (4) for other situations.

One or multiple data streams may be transmitted concurrently using a given diversity scheme. For each data stream, the received SNR for each subband used to transmit that data stream may be computed. The received SNRs for multiple subbands used for each data stream may then be used to select the transmission mode for that data stream.

F. Multi-Channel Transmission Scheme

For the multi-channel transmission (MCT) scheme, one or multiple data streams are independently processed at the transmitter to provide one or multiple corresponding modulation symbol streams. Each modulation symbol stream may then be sent on a respective group of transmission channels. Each transmission channel group may include:

1. multiple subbands of a single transmit antenna or spatial channel;
2. a single subband of multiple transmit antennas or spatial channels;
3. multiple subbands of multiple transmit antennas or spatial channels;
4. any combination of transmission channels; or
5. all transmission channels.

The transmission mode for each independently processed data stream may be independently selected such that improved performance (e.g., high throughput) is achieved.

Other processing schemes may also be implemented, and this is within the scope of the invention. As some examples, one data stream may be transmitted on (1) all subbands of all wideband eigenmodes, (2) each subband but from all transmit antennas, or (3) each or all transmit antennas on an assigned set of subbands.

6. System

Figure 7:
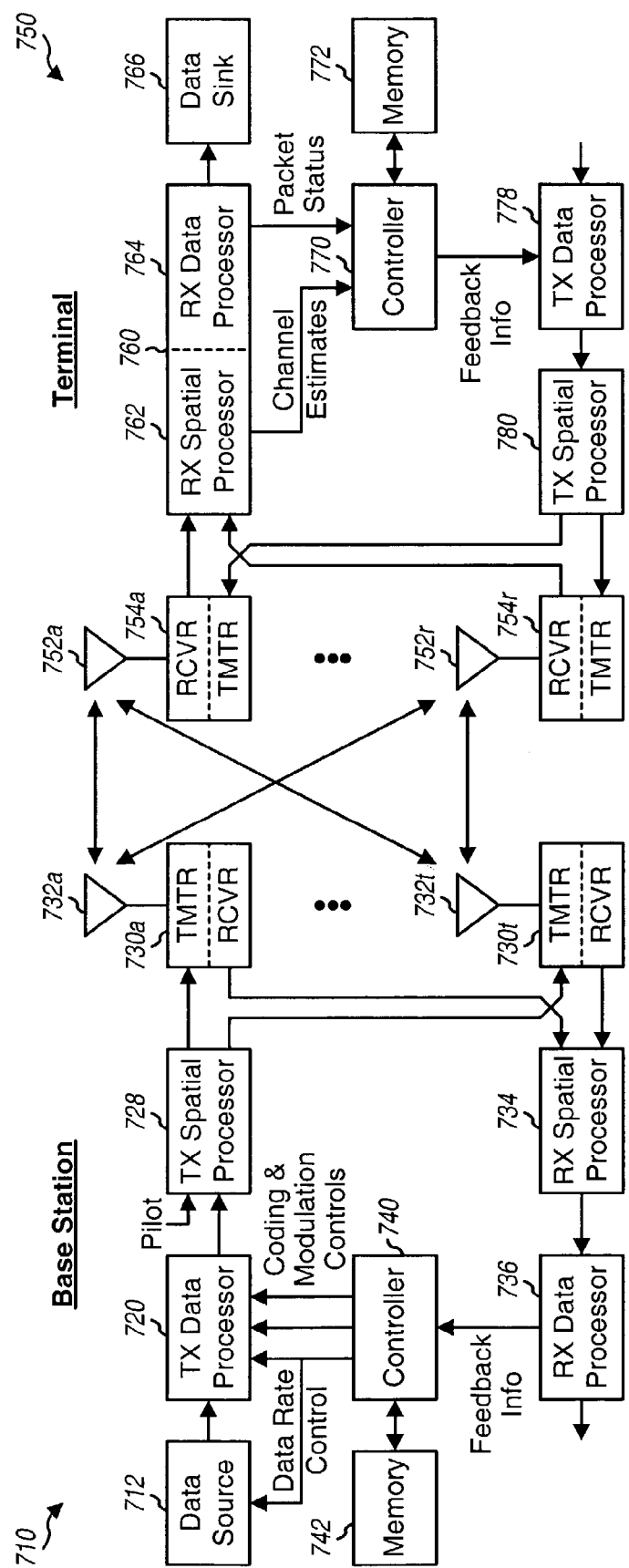
FIG. 7 shows a base station and a terminal in a MIMO-OFDM system.

FIG. 7 shows a block diagram of an embodiment of a base station 710 and a terminal 750 in a MIMO-OFDM system. Base station 710 may be used for transmitter 110 and terminal 750 may be used for receiver 150 in FIG. 1. For simplicity, FIG. 7 only shows data transmission on the downlink (i.e., forward link) from the base station to the terminal.

At base station 710, traffic data is provided from a data source 712 to a TX data processor 720. TX data processor 720 demultiplexes the traffic data into $N_D$ data streams, where $N_D \geq 1$, and further formats, codes, interleaves, and modulates each data stream to provide a corresponding modulation symbol stream. The data rate, coding, and modulation for each data stream may be determined by a data rate control, a coding control, and a modulation control, respectively, provided by a controller 740. TX data processor 720 provides $N_D$ modulation symbol streams to a TX spatial processor 728.

TX spatial processor 728 processes the $N_D$ modulation symbol streams in accordance with a selected transmission scheme (e.g., AAT, PAT, or PET) to provide $N_T$ transmit symbol streams. TX spatial processor 728 may also receive and multiplex pilot symbols with the transmit symbols. TX spatial processor 728 provides $N_T$ transmit symbol streams to $N_T$ transmitter units (TMTR) 730a through 730t.

Each transmitter unit 730 performs OFDM processing on its transmit symbol stream to provide a corresponding OFDM symbol stream, which is further processed to generate a modulated signal suitable for transmission over the wireless communication link. The $N_T$ modulated signals from transmitter units 730a through 730t are then transmitted via $N_T$ antennas 732a through 732t, respectively.

At terminal 750, the transmitted signals are received by each of $N_R$ antennas 752a through 752r, and the received signal from each antenna is provided to an associated receiver unit (RCVR) 754. Each receiver 754 conditions and digitizes its received signal to provide a stream of samples, which is further processed to provide a corresponding stream of received symbols. The $N_R$ received symbol streams from receiver units 754a through 754r are then provided to a receiver processor 760, which includes an RX spatial processor 762 and an RX data processor 764.

RX spatial processor 762 processes the $N_R$ received symbol streams in accordance with the selected transmission scheme to provide $N_D$ recovered symbol streams, which are estimates of the $N_D$ modulation symbol streams transmitted by base station 710. RX data processor 764 then decodes each recovered symbol stream to provide a corresponding decoded data stream, which is an estimate of the data stream transmitted by base station 710. The processing by RX spatial processor 762 and RX data processor 764 is complementary to that performed by TX spatial processor 728 and TX data processor 720, respectively, at base station 710.

As shown in FIG. 7, RX spatial processor 762 may derive estimates of certain channel characteristics (e.g., the channel response and noise variance) and provide the channel estimates to a controller 770. RX data processor 764 may also provide the status of each received data packet. Based on the various types of information received from RX spatial processor 762 and RX data processor 764, controller 770 determines a suitable transmission mode for each independently processed data stream, using the techniques described above. Controller 770 also provides feedback information, which may include a set of selected transmission modes for the data streams, the channel response estimates, ACKs and/or NAKs for the receive data packets, and so on, or any combination thereof. The feedback information is processed by a TX data processor 778 and a TX spatial processor 780, conditioned by transmitter units 754a through 754r, and transmitted from antennas 752a through 752r back to base station 710.

At base station 710, the transmitted signals from terminal 750 are received by antennas 732a through 732t, conditioned by receiver units 730a through 730t, and processed by an RX spatial processor 734 and an RX data processor 736 to recover the feedback information sent by terminal 750. The feedback information is then provided to controller 740 and used to control the processing of the $N_D$ data streams sent to terminal 750. For example, the data rate of each data stream may be determined based on the selected transmission mode provided by terminal 750. The coding and modulation schemes for each selected transmission mode are also determined by controller 740 and indicated by the coding and modulation controls provided to TX data processor 720 and TX spatial processor 728. The received ACK/NAK may be used to initiate either a full retransmission or an incremental transmission of each data packet received in error by the terminal. For an incremental transmission, a small portion of a data packet received in error is transmitted to allow the terminal to recover the packet.

Controllers 740 and 770 direct the operation at base station 710 and terminal 750, respectively. Memory units 742 and 772 provide storage for program codes and data used by controllers 740 and 770, respectively.

Figure 8A:
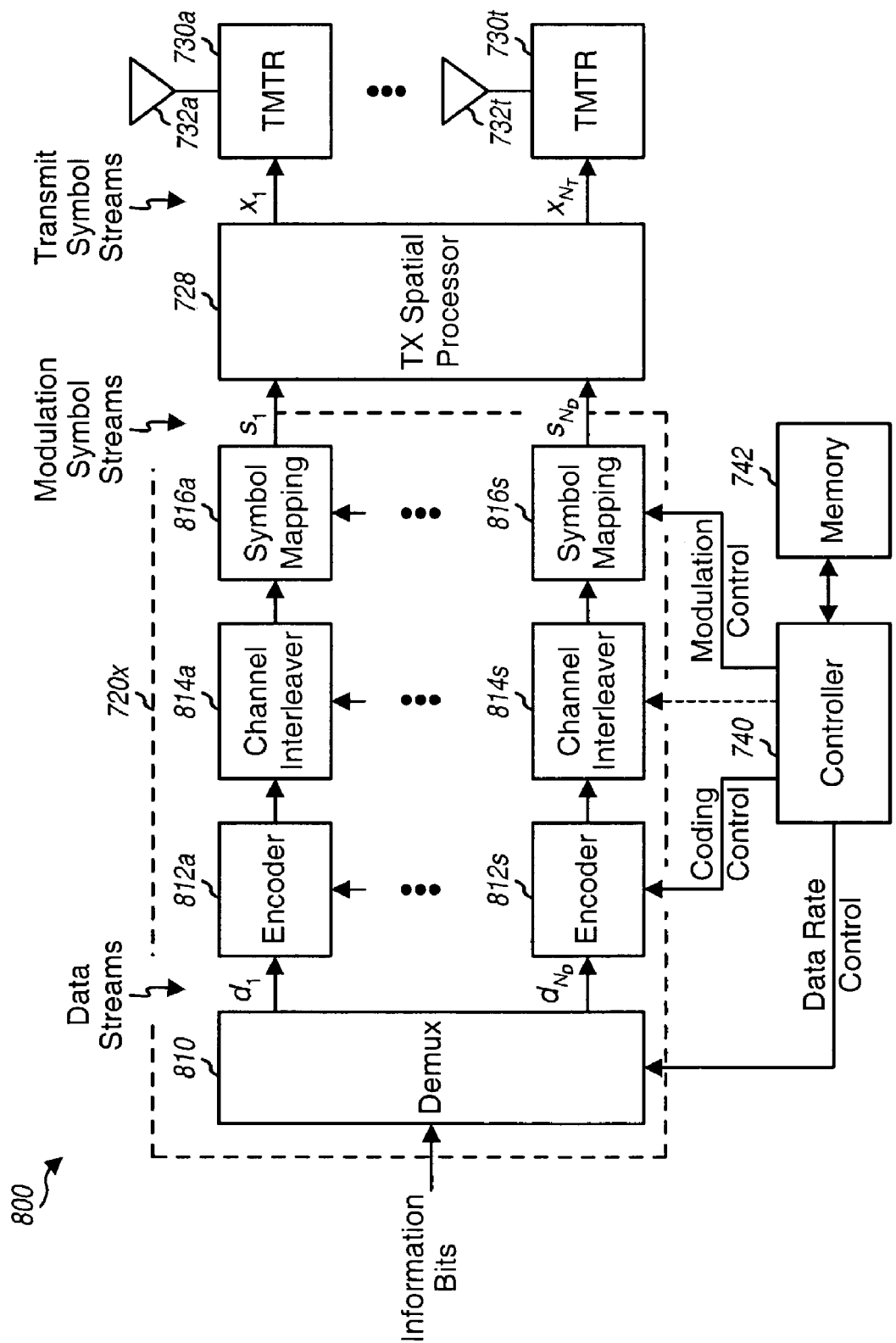
FIGS. 8A and 8B show a transmitter subsystem and a transmitter unit within the transmitter subsystem, respectively.

FIG. 8A shows a block diagram of a transmitter subsystem 800, which is an embodiment of the transmitter portion of base station 710 in FIG. 7. Transmitter subsystem 800 includes a TX data processor 720x, which is an embodiment of TX data processor 720 in FIG. 7.

For the embodiment shown in FIG. 8A, TX data processor 720x includes a demultiplexer (Demux) 810, $N_D$ encoders 812a through 812s, $N_D$ channel interleavers 814a through 814s, and $N_D$ symbol mapping units 816a through 816s (i.e., one set of encoder, channel interleaver, and symbol mapping unit for each data stream). Demultiplexer 810 demultiplexes the traffic data (i.e., the information bits) into $N_D$ data streams. Each of the $N_D$ data streams is provided at a data rate determined to be supported by the group of transmission channels used for that data stream, as indicated by the data rate control. Each data stream is provided to a respective encoder 812.

Each encoder 812 codes a respective data stream based on the selected coding scheme (as indicated by the coding control) to provide code bits. Each data stream may carry one or more data packets, and each data packet is typically coded separately to obtain a coded data packet. The coding increases the reliability of the data transmission. The selected coding scheme may include any combination of cyclic redundancy check (CRC) coding, convolutional coding, turbo coding, block coding, and so on. The code bits from each encoder 812 are then provided to a respective channel interleaver 814, which interleaves the code bits based on a particular interleaving scheme. If the interleaving is dependent on transmission mode, then controller 740 provides an interleaving control (as indicated by the dashed line) to channel interleaver 814. The interleaving provides time, frequency, and/or spatial diversity for the code bits. The interleaved bits from each channel interleaver 814 are then provided to a respective symbol mapping unit 816, which maps the interleaved bits based on the selected modulation scheme (as indicated by the modulation control) to obtain modulation symbols. Unit 816 groups each set of B interleaved bits to form a B-bit binary value, where $B \geq 1$, and further maps each B-bit value to a specific modulation symbol based on the selected modulation scheme (e.g., QPSK, M-PSK, or M-QAM, where $M=2^B$). Each modulation symbol is a complex value in a signal constellation defined by the selected modulation scheme. Symbol mapping units 816a through 816s provides $N_D$ modulation symbol streams.

Each data stream is transmitted on a respective group of transmission channels, and each transmission channel group may include any number and combination of subbands and antennas/spatial channels. TX spatial processor 728 performs the required spatial processing, if any, for the selected transmission scheme.

For the all-antenna transmission scheme, one data stream is transmitted on all subbands of all transmit antennas. Only one set of encoder 812, channel interleaver 814, and symbol mapping unit 816 is needed to process the single data stream. TX spatial processor 728 then simply demultiplexes the modulation symbols into $N_T$ transmit symbol streams for the $N_T$ transmit antennas. Since spatial processing is not performed for the AAT scheme, each transmit symbol is a modulation symbol.

For the per-antenna transmission scheme, one data stream is transmitted on all subbands of each transmit antenna. $N_T$ sets of encoder 812, channel interleaver 814, and symbol mapping unit 816 may be used to process $N_T$ data streams (where $N_D = N_T$) to provide $N_T$ modulation symbol streams. TX spatial processor 728 then simply passes each modulation symbol stream as a transmit symbol stream. Again, since spatial processing is not performed for the PAT scheme, each transmit symbol is a modulation symbol.

For the per-eigenmode transmission scheme, one data stream is transmitted on all subbands of each wideband eigenmode. $N_T$ sets of encoder 812, channel interleaver 814, and symbol mapping unit 816 may be used to process $N_T$ data streams (where $N_D = N_T$) to provide $N_T$ modulation symbol streams. TX spatial processor 728 then performs spatial processing on the $N_T$ modulation symbol streams, as shown in equation (16), to provide $N_T$ transmit symbol streams.

For the MCP scheme, each data stream is transmitted over a respective group of transmission channels. TX spatial processor 728 performs the appropriate demultiplexing and/or spatial processing of the modulation symbols to obtain transmit symbols for the group of transmission channels used for that data stream.

TX spatial processor 728 may further receive and multiplex pilot symbols with the transmit symbols, e.g., using time division multiplex (TDM) or code division multiplex (CDM). The pilot symbols may be sent in all or a subset of the transmission channels used to transmit traffic data. TX spatial processor 728 provides $N_T$ transmit symbol streams to $N_T$ transmitter units 730a through 730t.

Figure 8B:
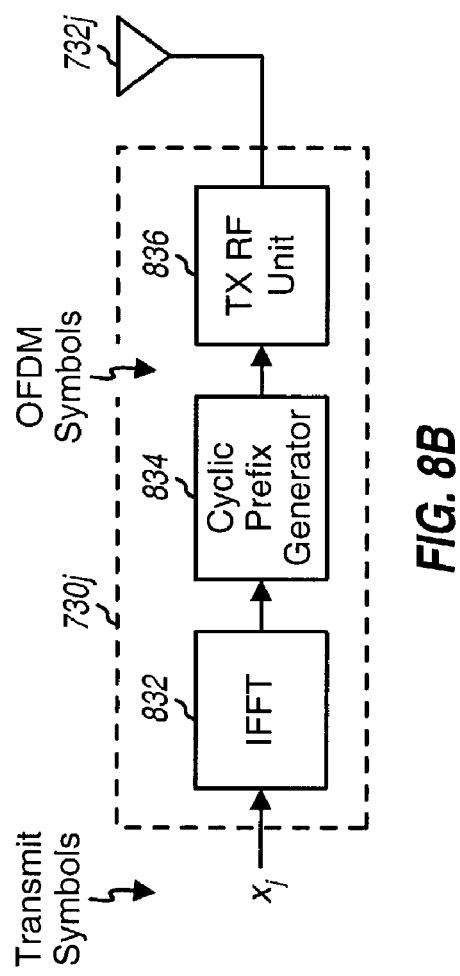

FIG. 8B shows an embodiment of a transmitter unit 730j, which may be used for each of transmitter units 730a through 730t in FIGS. 7 and 8A. Transmitter unit 730j includes an inverse fast Fourier transform (IFFT) unit 832, a cyclic prefix generator 834, and an TX RF unit 836. IFFT unit 832 and cyclic prefix generator 834 form an OFDM modulator.

Transmitter unit 730j receives the transmit symbol stream $x_j$ and groups each set of $N_F$ transmit symbols designated for transmission on the $N_F$ subbands. IFFT unit 832 then transforms each set of $N_F$ transmit symbols to the time domain using an $N_F$-point inverse fast Fourier transform to obtain a corresponding transformed symbol that contains $N_F$ samples. Cyclic prefix generator 834 then repeats a portion of each transformed symbol to obtain a corresponding OFDM symbol that contains $N_F + N_{CP}$ samples. The repeated portion is referred to as the cyclic prefix, and $N_{CP}$ indicates the number of samples being repeated (i.e., the cyclic prefix length). The cyclic prefix ensures that the OFDM symbol retains its orthogonal properties in the presence of multipath delay spread caused by frequency selective fading. Cyclic prefix generator 834 provides a stream of OFDM symbols, which is further processed (e.g., converted to one or more analog signals, amplified, filtered, and frequency upconverted) by TX RF unit 836 to generate a modulated signal.

The coding, modulation, and spatial processing for MIMO systems with and without OFDM are described in further detail in the following U.S. patent applications:

the aforementioned U.S. patent application Ser. No. 09/993,087;

U.S. patent application Ser. No. 09/854,235, entitled "Method and Apparatus for Processing Data in a Multiple-Input Multiple-Output (MIMO) Communication System Utilizing Channel State Information," filed May 11, 2001;

U.S. patent application Ser. Nos. 09/826,481 and 09/956,449, both entitled "Method and Apparatus for Utilizing Channel State Information in a Wireless Communication System," respectively filed Mar. 23, 2001 and Sep.18, 2001;

U.S. patent application Ser. No. 09/776,075, entitled "Coding Scheme for a Wireless Communication System," filed Feb. 1, 2001;

U.S. patent application Ser. No. 09/532,492, entitled "High Efficiency, High Performance Communications System Employing Multi-Carrier Modulation," filed Mar. 30, 2000; and the aforementioned provisional U.S. Patent Application Serial No. 60/421,309.

These patent applications are all assigned to the assignee of the present application. Other designs for the transmitter subsystem 800 may also be implemented and are within the scope of the invention.

Figure 9B:
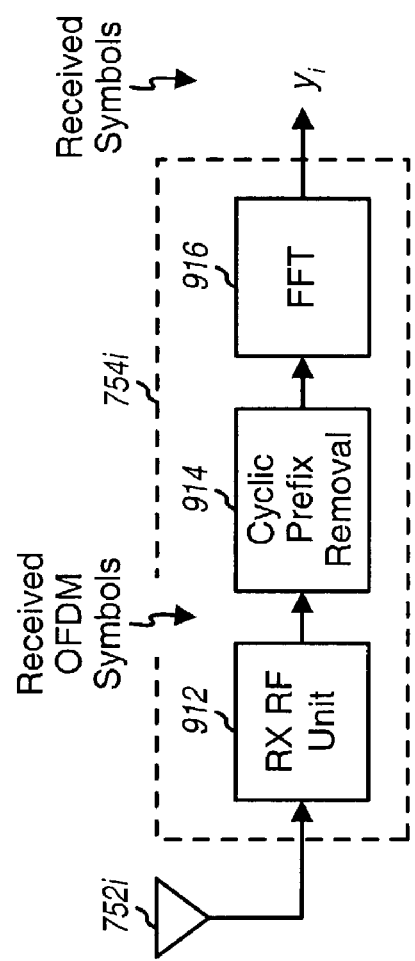
Figure 9A:
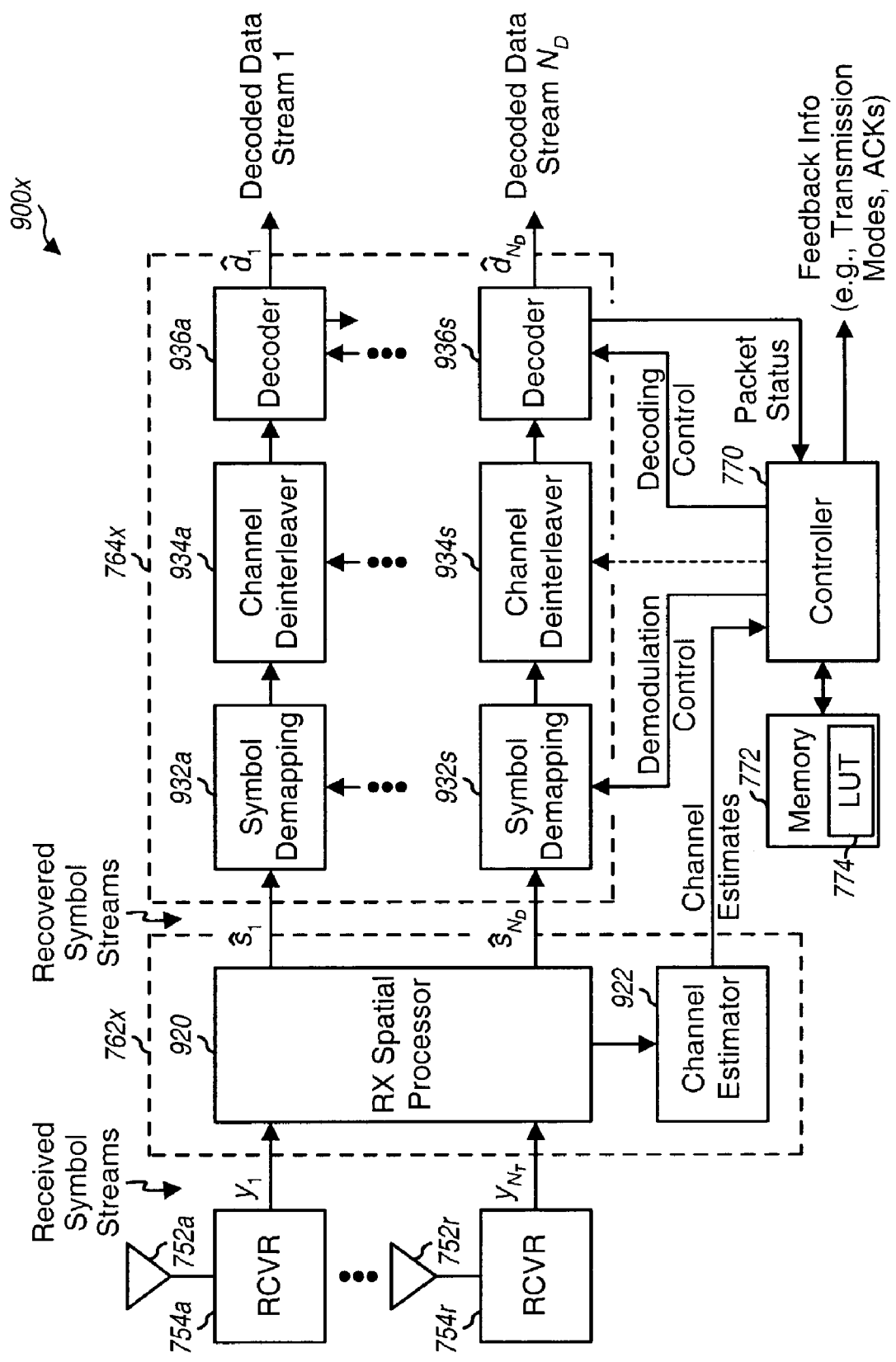

FIG. 9A shows a block diagram of a receiver subsystem 900x, which is an embodiment of the receiver portion of terminal 750 in FIG. 7. The transmitted signals from base station 710 are received by antennas 752a through 752r, and the received signal from each antenna is provided to a respective receiver unit 754.

FIG. 9B shows an embodiment of a receiver unit 754i, which may be used for each of receiver units 754a through 754r in FIG. 7 and 9A. The received signal is conditioned (e.g., amplified, filtered, and frequency downconverted) and digitized by an RX RF unit 912 to provide a stream of samples. A cyclic prefix removal unit 914 then removes the cyclic prefix in each received OFDM symbol to provide a corresponding received transformed symbol. A fast Fourier transform (FFT) unit 916 then transforms each received transformed symbol to the frequency domain using the fast Fourier transform to obtain a set of $N_F$ received symbols for the $N_F$ subbands. The received symbols are estimates of the transmit symbols sent by the base station. FFT unit 916 provides a received symbol stream $y_i$ for the received signal being processed by receiver unit 754i.

Referring back to FIG. 9A, receiver units 754a through 754r provide $N_R$ received symbol streams to a processor 762x. Within processor 762x, an RX spatial processor 920 performs spatial or space-time processing on the $N_R$ received symbol streams to provide $N_D$ recovered symbol streams, which are estimates of the $N_D$ modulation symbol streams. RX spatial processor 920 may implement a linear ZF equalizer, a channel correlation matrix inversion (CCMI) equalizer, a minimum mean square error (MMSE) equalizer, an MMSE linear equalizer (MMSE-LE), a decision feedback equalizer (DFE), or some other equalizer, which are described in detail in the aforementioned U.S. patent application Ser. Nos. 09/993,087, 09/854,235, 09/826,481, and 09/956,44.

An RX data processor 764x receives the $N_D$ recovered symbol streams from RX spatial processor 920. Each recovered symbol stream is provided to a respective symbol demapping unit 932, which demodulates the recovered symbols in accordance with a demodulation scheme that is complementary to the modulation scheme used for that stream, as indicated by a demodulation control provided by controller 770. The demodulated data stream from each symbol demapping unit 932 is then de-interleaved by an associated channel de-interleaver 934 in a manner complementary to that performed at the base station for that data stream. If the interleaving is dependent on transmission mode, then controller 770 provides a deinterleaving control to channel de-interleaver 934, as indicated by the dashed line. The de-interleaved data from each channel de-interleaver 934 is further decoded by an associated decoder 936 in a manner complementary to that performed at base station 710, as indicated by a decoding control provided by controller 770. For example, a turbo decoder or a Viterbi decoder may be used for decoder 936 if turbo or convolutional coding, respectively, is performed at the base station. The decoded data stream from each decoder 936 represents an estimate of the transmitted data stream. Decoder 936 may also provide the status of each received data packet (e.g., indicating whether the packet was received correctly or in error). Decoder 936 may further store demodulated data for packets decoded in error, so that this data may be combined with data from a subsequent incremental transmission and decoded.

In the embodiment shown in FIG. 9A, a channel estimator 922 estimates the channel response and the noise variance (e.g., based on the received pilot symbols) and provides the channel estimates to controller 770. Controller 770 implements transmission mode selector 166 in FIG. 2, performs various functions related to transmission mode selection, and determines a suitable transmission mode for each data stream based on the channel estimates. Memory unit 772 may store a look-up table 774 for supported transmission modes and their required SNRs.

Figure 10:
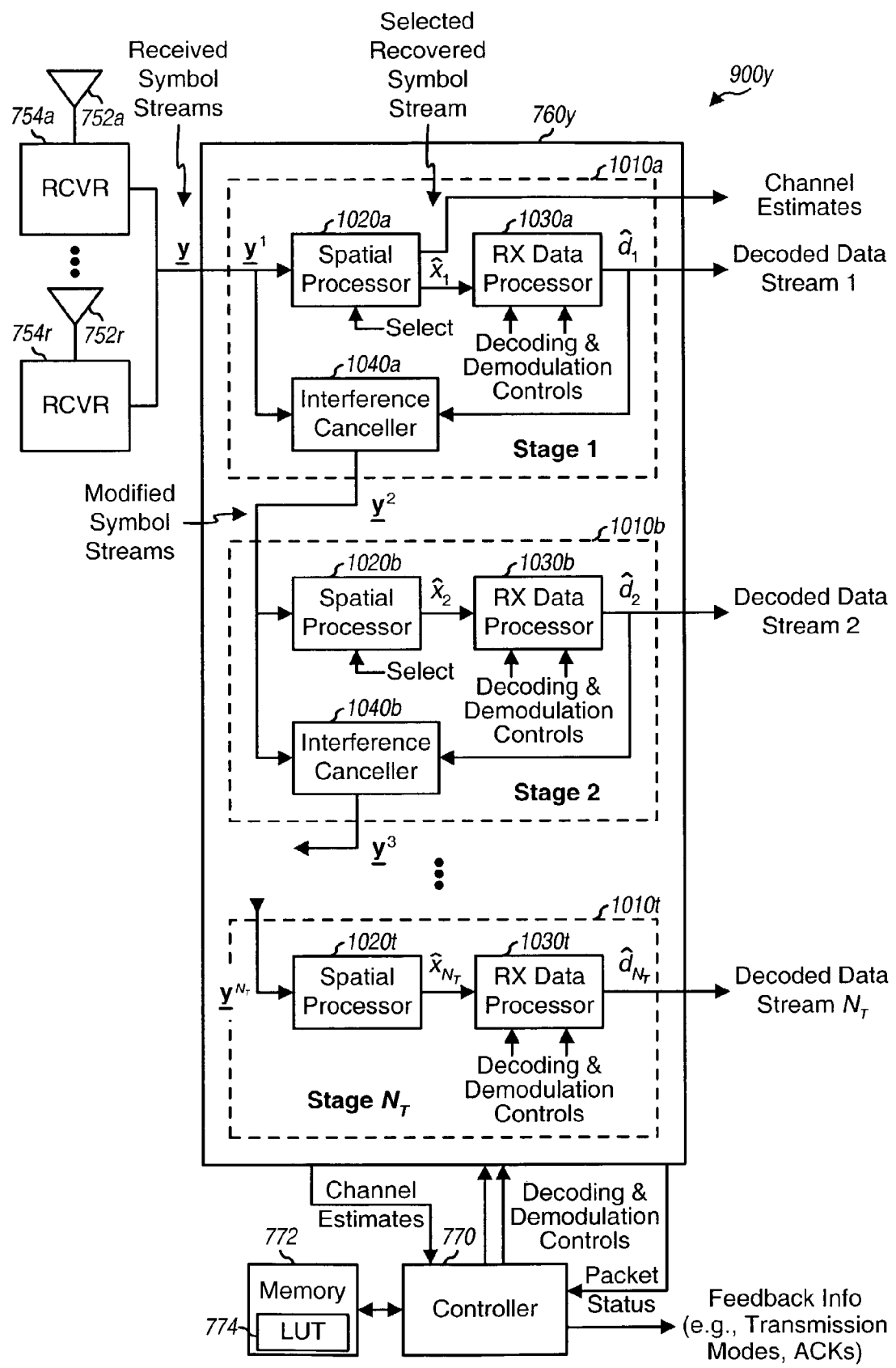
FIG. 10 shows a receiver subsystem that performs successive interference cancellation receiver processing.

FIG. 10 shows a block diagram of a receiver subsystem 900y, which is another embodiment of the receiver portion of terminal 750 in FIG. 7. Receiver subsystem 900y includes a receiver processor 760y that performs SIC processing and is an embodiment of receiver processor 760 in FIG. 7. For simplicity, the following description for receiver processor 760y is for the per-antenna transmission scheme.

For the embodiment shown in FIG. 10, receiver processor 760y includes a number of successive (i.e., cascaded) receiver processing stages 1010a through 1010t, one stage for each of the modulation symbol streams to be recovered. Each receiver processing stage 1010 (except for the last stage 1010t) includes a spatial processor 1020, an RX data processor 1030, and an interference canceller 1040. The last stage 1010t includes only spatial processor 1020t and RX data processor 1030t. Each RX data processor 1030 includes a symbol demapping unit, a channel deinterleaver, and a decoder, as shown in FIG. 9A.

For the first stage 1010a, spatial processor 1020a receives and processes the $N_R$ received symbol streams $y^1$ from receiver units 754a through 754r to provide $N_T$ recovered symbol streams $\hat{x}^1$. Spatial processor 1020 may implement a spatial or space-time equalizer such as a linear ZF equalizer, a CCMI equalizer, an MMSE equalizer, a MMSE-LE, or a DFE. For example, spatial processor 1020a may performed spatial processing as shown in equation (13). One recovered symbol stream is selected for decoding, and spatial processor 1020a provides the selected recovered symbol stream $\hat{x}_1$ to RX data processor 1030a. Processor 1030a further processes (e.g., demodulates, deinterleaves, and decodes) the selected recovered symbol stream $\hat{x}_1$ to provide a corresponding decoded data stream $\hat{d}_1$. Spatial processor 1020a may further provide an estimate of the channel response H(k), which is used to perform spatial or space-time processing by the stages.

For the first stage 1010a, interference canceller 1040a is provided with the $N_R$ received symbol streams $y^1$. Interference canceller 1040a also receives and processes (e.g., encodes, interleaves, and demodulates) the decoded data stream $\hat{d}_1$ from RX data processor 1030a to provide a remodulated symbol stream $\check{x}_1$ which is an estimate of the recovered symbol stream $x_1$ just decoded. The remodulated symbol stream $\check{x}_1$ is further processed in the time or frequency domain to derive estimates of the interference components $i^1$ due to this recovered symbol stream $\hat{x}_1$. The interference components $i^1$ are then subtracted from the first stage's received symbol streams $y^1$ to obtain $N_R$ modified symbol streams $y^2$, which include all but the cancelled interference components. The $N_R$ modified symbol streams $y^2$ are then provided to the next stage.

For each subsequent stage l, from the second stage 1010*b* through the last stage 1010*t*, spatial processor 1020 for that stage receives and processes the $N_R$ modified symbol streams $y^l$ from interference canceller 1040 in the preceding stage to provide the recovered symbol streams $\hat{x}^l$ for that stage. For each stage l, one recovered symbol stream $\hat{x}_l$ is selected and decoded by RX data processor 1030 to provide the corresponding decoded data stream $\hat{d}_l$. For each stage l, from the second stage through the second-to-last stage, the interference canceller in that stage receives the $N_R$ modified symbol streams $y^l$ from the interference canceller in the preceding stage and the decoded data stream $\hat{d}_l$ from the RX data processor within the same stage, derives the $N_R$ interference components $i^l$ due to the recovered symbol stream decoded in that stage, subtracts the interference components $i^l$ from the modified symbol streams $y^l$, and provides $N_R$ modified symbol streams $y^{l+1}$ for the next stage.

The SIC receiver processing technique is described in further detail in the aforementioned U.S. patent application Ser. Nos. 09/993,087 and 09/854,235.

For clarity, the transmission mode selection techniques have been described above for several specific multi-channel communication systems (e.g., an OFDM system and a MIMO-OFDM system with the all-antenna, per-antenna, and per-eigenmode transmission schemes). The computation of the received SNRs may be different for different types of communication systems, and may also be different for different receiver processing techniques. For clarity, exemplary methods of computing received SNRs have been described above. Other methods known in the art may also be used to compute the received SNRs, and this is within the scope of the invention.

FIGS. 7 through 10 show an exemplary design whereby the receiver sends back the selected transmission modes for the data streams. Other designs may also be implemented and are within the scope of the invention. For example, the channel estimates may be sent to the transmitter (instead of the transmission modes), which may then determine the transmission modes for the data streams based on these channel estimates.

For simplicity, FIGS. 7 through 10 show transmission mode selection for data transmission on the downlink. Transmission mode selection for data transmission on the uplink may be performed in similar manner. For example, transmitter subsystem 800 may be used for terminal 750, and receiver subsystems 900*x* and 900*y* may be used for base station 710.

The transmission mode selection techniques described herein may be implemented by various means. For example, these techniques may be implemented in hardware, software, or a combination thereof. For a hardware implementation, the units used for transmission mode selection may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the transmission mode selection may be implemented with modules (e.g., procedures, functions, and so on) that perform the functions described herein. The software codes may be stored in a memory unit (e.g., memory unit 742 or 772 in FIG. 7) and executed by a processor (e.g., controller 740 or 770). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of determining transmission modes for data transmission in a multi-channel communication system, comprising:

obtaining a signal-to-noise ratio (SNR) estimate for each of a first plurality of transmission channels with varying SNRs used for a first data stream;

computing a first average SNR and a first SNR variance based on SNR estimates for the first plurality of transmission channels;

determining a first back-off factor as a product of a first scaling factor with the first SNR variance, which accounts for frequency selectivity of a communication link associated with the first plurality of transmission channels;

calculating a first operating SNR value for the first plurality of transmission channels by subtracting the first back-off factor from the first average SNR value;

determining a first transmission mode for the first data stream based on the first operating SNR value, wherein the first transmission mode indicative of a particular data rate, a particular coding scheme, and a particular modulation scheme employed for data transmission;

utilizing the first transmission mode to transmit the first data stream over each of the first plurality of transmission channels;

obtaining an SNR estimate for each of a second plurality of transmission channels with varying SNRs used for a second data stream, wherein the first plurality of transmission channels is for a first antenna and the second plurality of transmission channels is for a second antenna associated with the multi-channel communication system;

computing a second average SNR and a second SNR variance based on the SNR estimates for each of the second plurality of transmission channels;

determining a second back-off factor as a product of a second scaling factor with the second SNR variance, which accounts for frequency selectivity of a communication link associated with the second plurality of transmission channels;

calculating a second operating SNR value for the second plurality of transmission channels by subtracting the second back-off factor from the second average SNR value;

determining a second transmission mode for the second data stream based on the second operating SNR value, wherein the second transmission mode indicative of a particular data rate, a particular coding scheme, and a particular modulation scheme employed for data transmission; and utilizing the second transmission mode to transmit the second data stream over each of the second plurality of transmission channels, wherein the determining the first and the second transmission mode includes computing transmission modes for a multiple-input multiple-output (MIMO) communication system, and wherein the obtaining the SNR estimates for the first plurality of transmission channels includes obtaining the SNR estimates for a first spatial channel by decomposition of a first channel response matrix and the obtaining the SNR estimates for the second plurality of transmission channels includes obtaining the SNR estimates for a second spatial channel by decomposition of a second channel response matrix.

2. The method of claim 1, further comprising, transmitting feedback information that includes the first and the second transmission mode to a transmitter, wherein the transmitter can utilize the first and the second transmission mode to transmit the first and second data stream respectively.

3. The method of claim 1, further comprising:
determining the first transmission mode based on a first comparison of the first operating SNR and a required SNR stored in a look up table; and,
determining the second transmission mode based on a second comparison of the second operating SNR and the required SNR stored in the look up table.

4. The method of claim 1, wherein the determining of the first back-off factor includes determining the first back-off factor as a function of the first average SNR.

5. The method of claim 1, wherein the determining the first back-off factor includes multiplying the first variance of the SNR estimates by the first scaling factor, which is selected based on one or more characteristics of the multi-channel communication system.

6. The method of claim 5, further comprising selecting the first scaling factor based on at least one of interleaving, a packet size, or a type of coding scheme employed for the data transmission.

7. The method of claim 1, wherein the determining the first back-off factor includes calculating the first back-off factor based on the first average SNR, and, the determining the second back-off factor includes calculating the second back-off factor based on the second average SNR.

8. The method of claim 1 wherein the determining the first and second back-off factors includes computing fixed values for the first and second back-off factors.

9. The method of claims 1, wherein the determining the first and the second transmission mode includes computing transmission modes for an orthogonal frequency division multiplex (OFDM) communication system, wherein the first and second plurality of transmission channels correspond to a plurality of subbands.

10. The method of claim 1, wherein the determining the first and the second transmission mode includes computing transmission modes for a multiple-input multiple-output (MIMO) communication system, wherein the first and second plurality of transmission channels correspond to a plurality of flat-fading narrowband spatial channels with different SNRs, which are formed by a number of transmit antennas and receive antennas.

11. The method of claim 1, wherein the determining the first and the second transmission mode includes computing transmission modes for a multiple-input multiple-output (MIMO) communication system that utilizes orthogonal frequency division multiplex (OFDM).

12. The method of claim 11, wherein the obtaining the SNR estimates for the first and second plurality of transmission channels includes obtaining the SNR estimates for a plurality of subbands of at least one spatial channel.

13. The method of claim 11, wherein the obtaining the SNR estimates for the first and second plurality of transmission channels includes obtaining the SNR estimates for a plurality of subbands of at least one of the first or second antennas.

14. The method of claim 11, wherein the obtaining the SNR estimates for the first and second plurality of transmission channels includes obtaining the SNR estimates for a plurality of subbands of a plurality of transmit antennas.

15. A system that identifies a transmission mode for data transmission over multiple transmission channels with different received SNRs (signal-to-noise ratios) in a multiple-input multiple-output (MIMO) communication system, comprising:
an SNR statistics computation unit that receives SNR estimates for each of the multiple transmission channels utilized to transmit a data stream and calculates an average SNR and a SNR variance for the multiple transmission channels based in part on the received SNR estimates, wherein the SNR estimates for the multiple transmission channels includes a SNR estimate for a spatial channel of the MIMO communication system obtained by decomposition of a channel response matrix;
an operating SNR computation unit that determines an operating SNR for the multiple transmission channels by subtracting a back-off factor from the average SNR, wherein the back-off factor is a product of a scaling factor with the SNR variance and accounts for a frequency selectivity of a communication link associated with the multiple transmission channels;
a memory unit that includes a look up table, which stores a set of supported transmission modes, for the MIMO communication system, along with a required SNR for each of the set of supported transmission modes; and
a transmission mode selector unit that accesses the memory unit and identifies the transmission mode from the look up table based on a comparison of the operating SNR and the required SNR for each of the set of supported transmission modes, wherein the identified transmission mode is utilized during transmission of the entire data stream over each of the multiple transmission channels.

16. The system of claim 15, further comprising, a channel estimator unit that processes received symbols to obtain the SNR estimates for each of the multiple transmission channels.

17. The system of claim 15, further comprising a controller unit that generates feedback information for a transmitter based in part on the identified transmission mode and a packet status, wherein the feedback information is utilized by the transmitter to transmit the data stream over the multiple transmission channels based on parameters specified in the identified transmission mode.

18. The system of claim 17, wherein the feed back information includes at least one of the transmission mode, acknowledgements, or negative acknowledgements, for received data packets.

19. A system that facilitates determination of a transmission mode for a data stream transmitted over a group of transmission channels in a multiple-input multiple-output (MIMO) communication system, comprising:
means for obtaining a signal-to-noise ratio (SNR) estimate for each of the group of transmission channels with different SNRs, wherein the means for obtaining determines SNR estimates for a spatial channel in the MIMO communication system obtained by decomposition of a channel response matrix;

means for calculating an average SNR for the group of transmission channels and a SNR variance for the group of transmission channels based on the obtained SNR estimates;

means for determining a back-off factor based on a product of a scaling factor with the SNR variance, wherein the back-off factor accounts for a frequency selectivity of a communication link associated with the group of transmission channels;

means for generating an operating SNR value for the group of transmission channels by subtracting the back-off factor from the average SNR;

means for determining the transmission mode of the MIMO communication system, that is employed for transmitting the data stream over the group of transmission channels based in part on a comparison of the operating SNR value with one or more required SNR values corresponding to one or more supported transmission modes, wherein the transmission mode indicative of a data rate, a coding scheme, and a modulation scheme employed for data transmission; and means for transmitting the data stream over each of the group of transmission channels by utilizing the transmission mode.

20. The system of claim 19, further comprising, means for computing feedback information based in part on the determined transmission mode and a packet status, wherein the means for transmitting utilizes the feedback information for transmission of the data stream.

* * * * *